(12) United States Patent
Kawamoto et al.

(10) Patent No.: US 11,914,544 B2
(45) Date of Patent: Feb. 27, 2024

(54) MEMORY SYSTEM, METHOD OF CONTROLLING MEMORY SYSTEM, AND HOST SYSTEM

(71) Applicant: Kioxia Corporation, Tokyo (JP)

(72) Inventors: Nana Kawamoto, Yokohama Kanagawa (JP); Naoki Kimura, Ebina Kanagawa (JP)

(73) Assignee: Kioxia Corporation, Tokyo (JP)

( * ) Notice: Subject to any disclaimer, the term of this patent is extended or adjusted under 35 U.S.C. 154(b) by 63 days.

(21) Appl. No.: 17/841,390

(22) Filed: Jun. 15, 2022

(65) Prior Publication Data
US 2023/0305986 A1  Sep. 28, 2023

(30) Foreign Application Priority Data
Mar. 22, 2022 (JP) .................. 2022-045462

(51) Int. Cl.
*G06F 13/42* (2006.01)
*G06F 13/16* (2006.01)
*G06F 13/40* (2006.01)

(52) U.S. Cl.
CPC ...... *G06F 13/4221* (2013.01); *G06F 13/1668* (2013.01); *G06F 13/409* (2013.01)

(58) Field of Classification Search
CPC . G06F 13/4221; G06F 13/1668; G06F 13/409
See application file for complete search history.

(56) References Cited

U.S. PATENT DOCUMENTS

| | | | | |
|---|---|---|---|---|
| 2010/0257313 A1* | 10/2010 | Nishizawa | ........... | G06K 19/077 711/147 |
| 2016/0062652 A1* | 3/2016 | Hia | ........ | G06F 3/0604 711/102 |
| 2018/0239696 A1* | 8/2018 | Lim | ........ | G06F 3/0679 |
| 2019/0272245 A1* | 9/2019 | Olarig | ........ | G06F 13/1668 |
| 2020/0356303 A1* | 11/2020 | Shaver | ........ | G06F 13/385 |
| 2021/0015006 A1 | 1/2021 | Muto | | |
| 2021/0374082 A1* | 12/2021 | Hsiao | ........ | G06F 13/4282 |
| 2022/0302661 A1 | 9/2022 | Matsuzaki et al. | | |

FOREIGN PATENT DOCUMENTS

| | | |
|---|---|---|
| JP | 2585683 B2 | 2/1997 |
| JP | 2000-099220 A | 4/2000 |

\* cited by examiner

*Primary Examiner* — Nimesh G Patel
(74) *Attorney, Agent, or Firm* — Foley & Lardner LLP

(57) ABSTRACT

According to one embodiment, a memory system includes a board, a memory controller, and a semiconductor memory. When a signal input to a third port or a command received from an outside of the memory system satisfies a first condition, the memory controller is configured to use a first port as a first signal port and to use a second port as a second signal port. When the signal input to the third port or the command received from the outside of the memory system satisfies a second condition, the memory controller is configured to use the first port as the second signal port and to use the second port as the first signal port.

11 Claims, 21 Drawing Sheets

FIG. 18
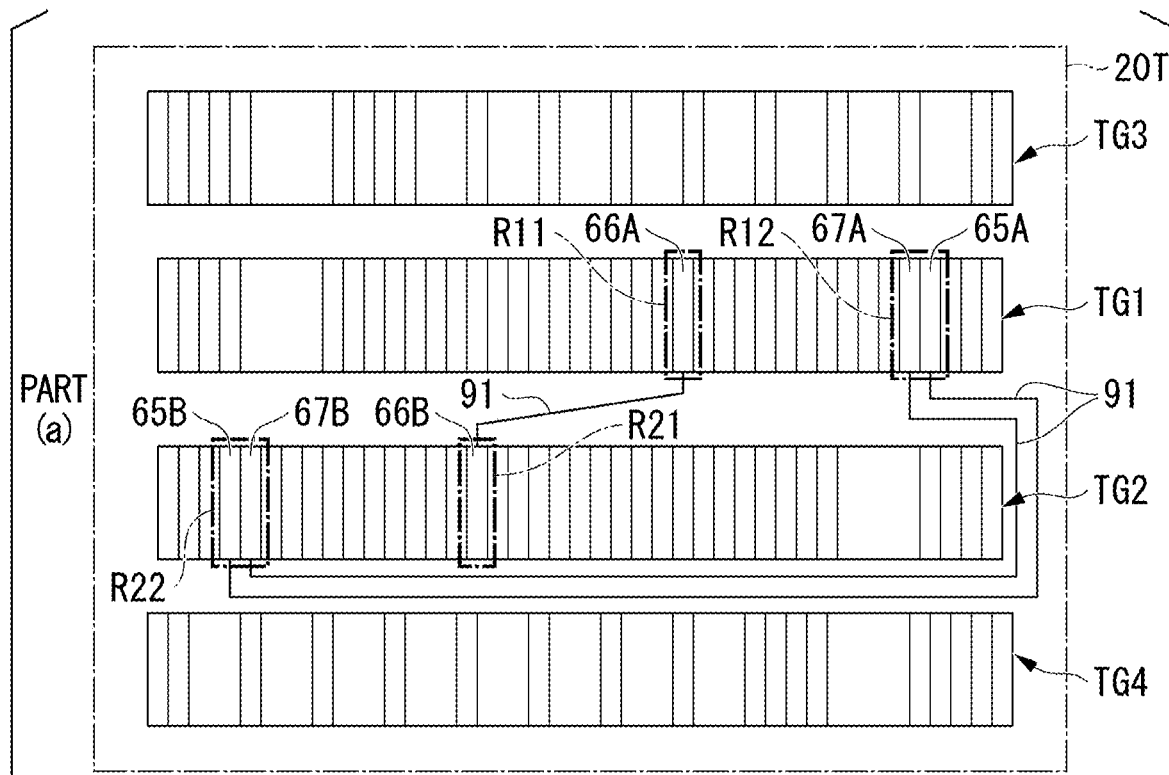
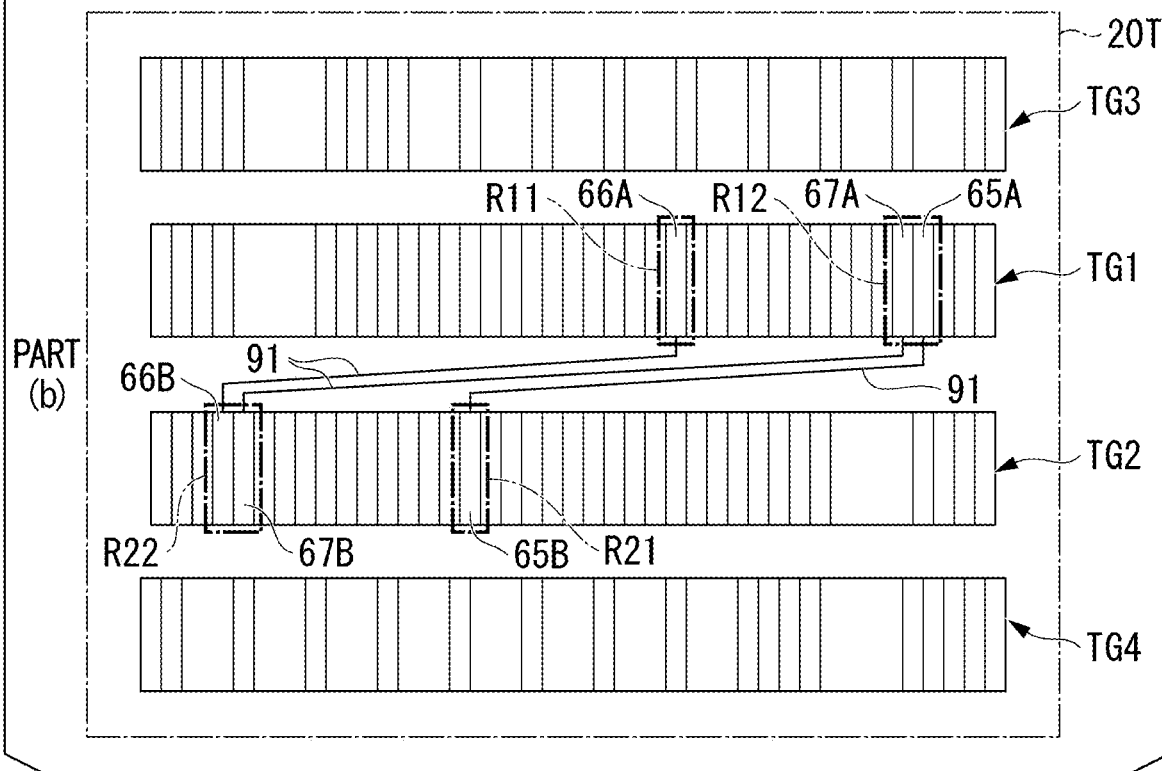

MEMORY SYSTEM, METHOD OF CONTROLLING MEMORY SYSTEM, AND HOST SYSTEM

CROSS-REFERENCE TO RELATED APPLICATION

This application is based upon and claims the benefit of priority from Japanese Patent Application No. 2022-045462, filed Mar. 22, 2022, the entire contents of which are incorporated herein by reference.

FIELD

Embodiments described herein relate generally to a memory system, a method of controlling a memory system, and a host system.

BACKGROUND ART

A storage system including a host system and a memory system configured to execute an operation in accordance with instructions received from the host system is known. For example, such a storage system includes a printed wiring board on which a connector is mounted. In this example, the host system is connected to the memory system via the connector.

BRIEF DESCRIPTION OF THE DRAWINGS

FIG. 18 is an explanatory view of terminal arrangements of second terminal groups of the second embodiment and the Comparative Example.

DETAILED DESCRIPTION

Figure 1:
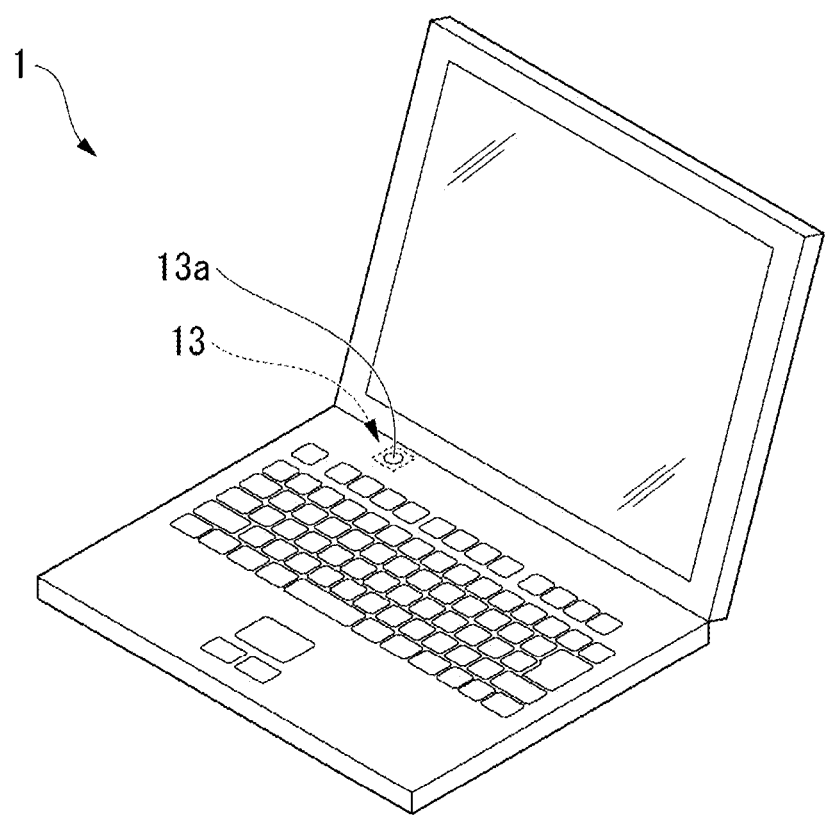
FIG. 1 is a perspective view showing an overall configuration of a storage system according to a first embodiment.

According to one embodiment, a memory system includes a board, a memory controller, and a semiconductor memory. The board includes a terminal part. The terminal part is connectable to an outside connector. The memory controller is on the board. The semiconductor memory is on the board. The semiconductor memory is connected to the memory controller. The terminal part includes a first terminal, a second terminal, and a third terminal. The memory controller includes a first port, a second port, and a third port. The first port is connected to the first terminal. The second port is connected to the second terminal. The third port is connected to the third terminal. When a signal input to the third port or a command received from the outside of the memory system satisfies a first condition, the memory controller is configured to use the first port as a first signal port for a first signal and to use the second port as a second signal port for a second signal different from the first signal. When the signal input to the third port or the command received from the outside of the memory system satisfies a second condition different from the first condition, the memory controller is configured to use the first port as the second signal port and to use the second port as the first signal port.

Hereinafter, a memory system, a method of controlling a memory system, and a host system according to an embodiment will be described with reference to the drawings. In the following description, configurations having the same or similar functions are denoted by the same reference numerals. Duplicate description of those configurations may be omitted. The term "parallel", "orthogonal", or "same" may also include cases of "substantially parallel", "substantially orthogonal", or "substantially the same", respectively. The term "connection" is not limited to mechanical connection, but may also include electrical connection. That is, the term "connection" is not limited to a case in which it is directly connected to an object, but may also include a case in which it is connected to the object with another element interposed therebetween.

First Embodiment

1. Overall Configuration of Storage System

FIG. 1 is a perspective view showing an overall configuration of a storage system 1 according to the first embodiment. The storage system 1 is, for example, an information processing device (or electronic device) such as a notebook personal computer. However, the storage system 1 is not limited to the above example, and various information processing devices such as a stationary personal computer, a server device, a mobile information terminal device, and an in-vehicle device are appropriately applicable.

The storage system 1 includes, for example, a notification device 13. The notification device 13 is a device configured to notify a state of an SSD (Solid State Drive) module 30 to be described below (refer to FIG. 2) to an outside (for example, a user). The notification device 13 includes, for example, a light-emitting diode (LED) 13a and a control circuit. The LED 13a can be visually recognized from the outside of the storage system 1. The control circuit is configured to control light emission of the LED 13a. For example, when the SSD module 30 is in operation, the notification device 13 provides notification that the SSD module 30 is in operation by blinking the LED 13a.

Figure 2:
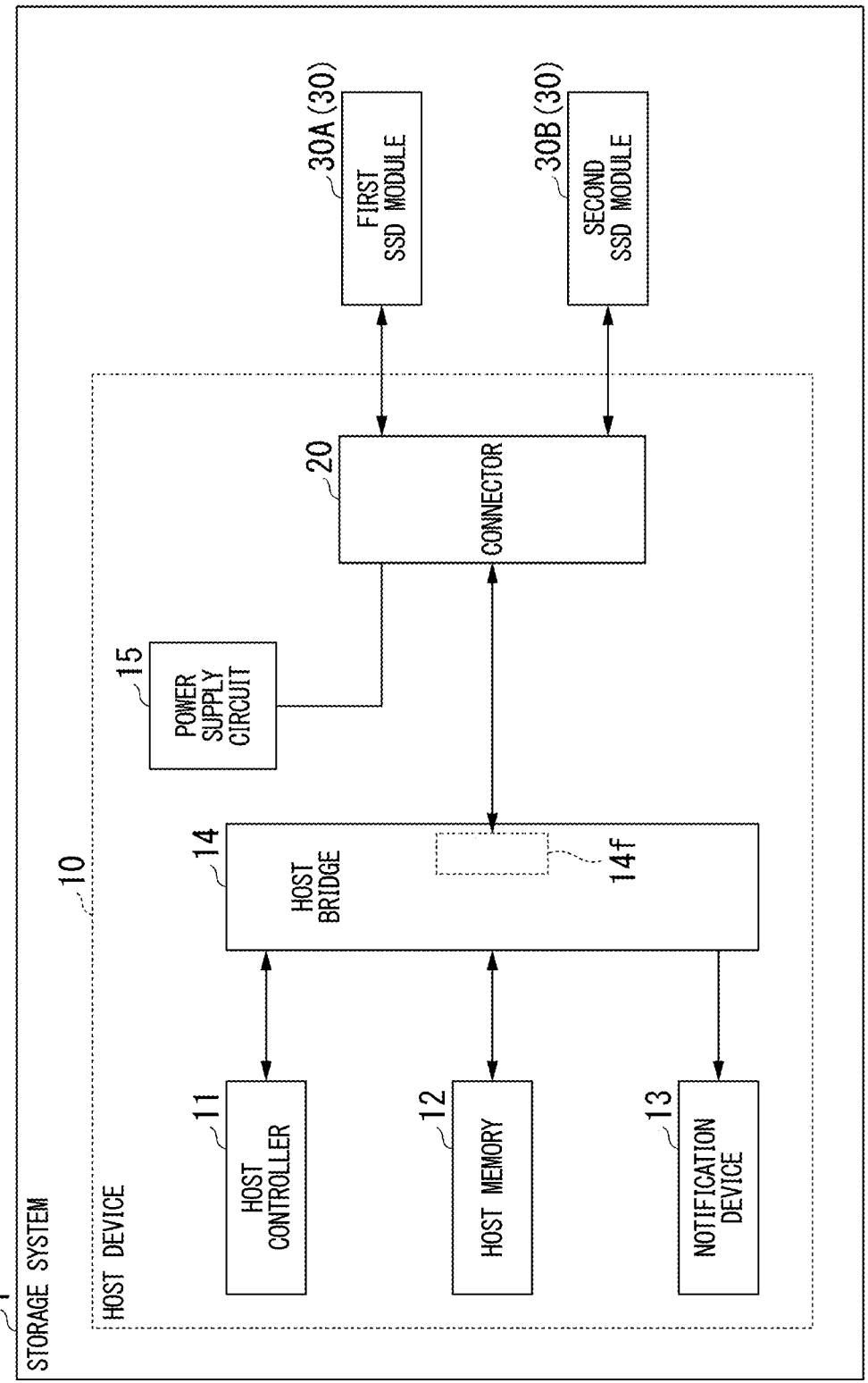
FIG. 2 is a block diagram showing part of a functional configuration of the storage system according to the first embodiment.

FIG. 2 is a block diagram showing part of a functional configuration of the storage system 1. The storage system 1 includes, for example, a host device 10 and a plurality of SSD modules 30. The plurality of the SSD modules 30 include a first SSD module 30A and a second SSD module 30B. In the embodiment, in a case in which the first SSD module 30A and the second SSD module 30B are not distinguished, they are referred to as an "SSD module 30".

The host device 10 includes, for example, a host controller 11, a host memory 12, the notification device 13, a host bridge 14, as power supply circuit 15, and a connector 20. The host device 10 is an example of "host system". Note that, the connector 20 may be provided as a configuration outside the host device 10.

The host controller 11 is a hardware circuit equipped with the storage system 1. The host controller 11 is realized by executing a program (software) by a hardware processor such as a central processing unit (CPU). Note that all or some of the functions of the host controller 11 may be realized by hardware (including circuit section; circuitry), such as an application specific integrated circuit (ASIC), a programmable logic device (PLD), or a field programmable gate array (FPGA), or may be realized by cooperation of software and hardware.

The host controller 11 controls the entirety of the storage system 1. For example, the host controller 11 performs writing of data or reading of data with respect to the SSD module 30. In the embodiment, the host controller 11 is configured to transmit and receive data to and from the SSD module 30 via the host bridge 14 and the connector 20.

The host memory 12 is configured by a DRAM (Dynamic Random Access Memory), an SRAM (Static Random Access Memory), or the like. The host memory 12 is, for example, a data buffer for temporarily storing data transferred between the host controller 11 and the SSD module 30.

The host bridge 14 is connected to the host controller 11, the host memory 12, the notification device 13, and the connector 20. The host bridge 14 includes a host interface circuit (host I/F) 14f. The host I/F 14f is a hardware circuit that performs transmission and reception of data, commands, and addresses between the host controller 11 and the SSD module 30. The host bridge 14 is an example of a "bridge circuit". For example, the host I/F 14f conforms to communication interface standards such as PCI Express (PCIe)™, Serial Advanced Technology Attachment (SATA), or the like.

The power supply circuit 15 is provided on a circuit board 16 (refer to FIG. 4) to be described below. The power supply circuit 15 is connected to the connector 20. The power supply circuit 15 supplies power to the SSD module 30 via the connector 20.

The connector 20 is connected to the host bridge 14, the power supply circuit 15, and the SSD module 30. The SSD module 30 has a configuration detachably attached to the connector 20. The connector 20 connects the host bridge 14 and the SSD module 30 to each other. Also, the connector 20 connects the power supply circuit 15 and the SSD module 30 to each other. When viewed from the SSD module 30, the connector 20 is an example of "outside connector". Details of the connector 20 will be described below.

The SSD module 30 is a storage device that non-volatilely stores the data received from the host device 10. The first SSD module 30A is an example of a "first memory system". The second SSD module 30B is an example of a "second memory system".

2. Configuration of SSD Module

Figure 3:
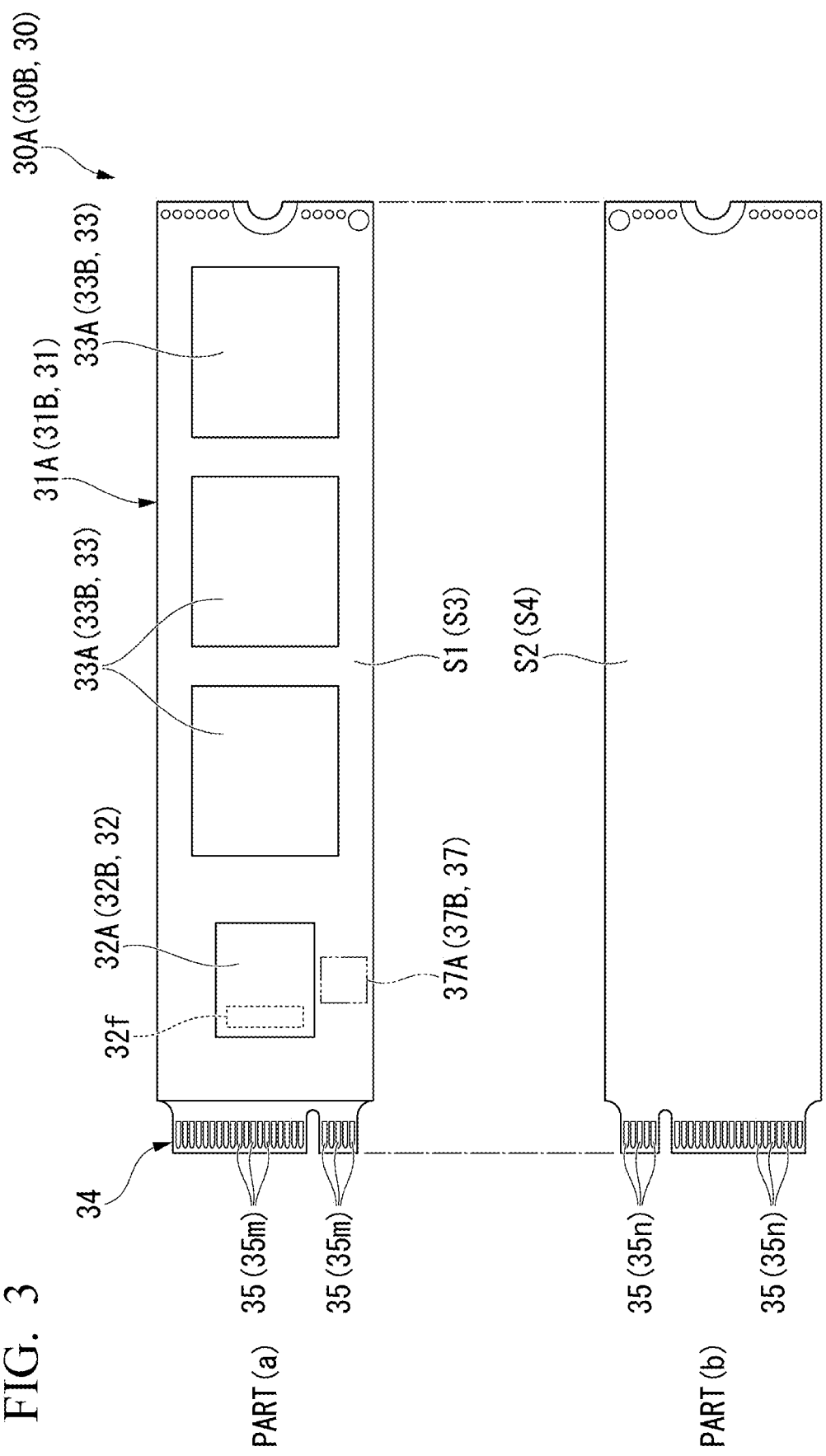
FIG. 3 is a view showing an SSD module according to the first embodiment.

FIG. 3 is a view showing the SSD module 30 (for example, the first SSD module 30A). PART (a) of FIG. 3 is a surface view of the SSD module 30 (for example, the first SSD module 30A). PART (b) of FIG. 3 is a back view of the SSD module 30 (for example, the first SSD module 30A). That is, PART (b) of FIG. 3 is a view showing the SSD module 30 shown in PART (a) of FIG. 3 in a reversed state. The first SSD module 30A includes a first substrate 31A, a first memory controller 32A, and one or more (for example, a plurality of) first semiconductor memories 33A.

The first substrate 31A is a circuit board or a printed wiring board having an insulator such as a glass epoxy resin and a wiring pattern. The wiring pattern is provided on a surface layer and an inner layer of the insulator. The first substrate 31A has a first surface S1 and a second surface S2 located on a side opposite to the first surface S1. The first surface S1 is an example of a top surface. The second surface S2 is an example of a back surface.

One end portion of the first substrate 31A includes a terminal part 34 connectable to the connector 20. The terminal part 34 includes a plurality of terminals 35. The plurality of the terminals 35 include a plurality of terminals 35m and a plurality of terminals 35n. The terminals 35m are provided on the first surface S1 of the first substrate 31A. The terminals 35n are provided on the second surface S2 of the first substrate 31A. The terminal part 34 conforms to the same communication interface standards as those of the host I/F 14f of the host bridge 14. The terminal part 34 conforms to, for example, the M.2 standard.

The first memory controller 32A includes an interface circuit (host connection I/F) 32f connectable to the host I/F 14f of the host bridge 14. The host connection I/F 32f is connected to the host I/F 14f (refer to FIG. 2) via the terminal part 34 of the first substrate 31A and the connector 20. The host connection I/F 32f conforms to the same communication interface standards as those of the host I/F 14f.

The first memory controller 32A is connected to the plurality of the first semiconductor memories 33A through wirings of the first substrate 31A. The first memory controller 32A controls the plurality of the first semiconductor memories 33A. For example, the first memory controller 32A performs writing of data, reading of data, and erasing of data with respect to the plurality of the first semiconductor memories 33A based on instructions received from the host device 10. The first memory controller 32A is mounted, for example, on the first surface S1 of the first substrate 31A.

The first semiconductor memory 33A is a non-volatile semiconductor memory that non-volatilely stores data. The first semiconductor memory 33A is, for example, a NAND flash memory. However, the first semiconductor memory 33A is not limited to the above example and may be a magnetoresistive random access memory (MRAM) or other type of storage device. The plurality of the first semiconductor memories 33A are mounted on, for example, the first surface S1 of the first substrate 31A.

The first SSD module 30A may include a first volatile memory 37A mounted on the first substrate 31A in addition to the above-described configuration. The first volatile memory 37A is configured of a DRAM or the like. The first volatile memory 37A includes a data buffer for temporarily storing data transferred between the host device 10 and the first semiconductor memory 33A. The first volatile memory 37A may be provided inside the first memory controller 32A.

Similarly, the second SSD module 30B includes a second substrate 31B, a second memory controller 32B, and one or more (for example, a plurality of) second semiconductor memories 33B. In the embodiment, the second SSD module 30B is a memory module of the same type as the first SSD module 30A. Here, the term "same type" includes a case in which a configuration and a specification of at least the terminal part 34 of the first SSD module 30A are the same as those of the second SSD module 30B. Therefore, the terms "first SSD module 30A", "first substrate 31A", "first surface S1", "second surface S2", "first memory controller 32A", "first semiconductor memory 33A", and "first volatile memory 37A" in the above description regarding the first SSD module 30A need only be replaced with the terms "second SSD module 30B", "second substrate 31B", "third surface S3", "fourth surface S4", "second memory controller 32B", "second semiconductor memory 33B", and "second volatile memory 37B" in description regarding the second SSD module 30B, respectively.

In the following explanation, in a case in which the first SSD module 30A and the second SSD module 30B are not distinguished, the first substrate 31A or the second substrate 31B may be referred to as "board 31", the first memory controller 32A or the second memory controller 32B may be referred to as "memory controller 32", the first semiconductor memory 33A or the second semiconductor memory 33B may be referred to as "semiconductor memory 33", and the first volatile memory 37A or the second volatile memory 37B may be referred to as "volatile memory 37".

In the embodiment, the first SSD module 30A and the second SSD module 30B are exactly the same type of memory module including device arrangement. However, the term "the same type of memory module" is not limited to a memory module of the same type exactly and need only be a memory module conforming to the same standard. For example, the first SSD module 30A and the second SSD module 30B may have different numbers and capacities of mounted semiconductor memories.

3. Mounting Posture of SSD Module

Figure 4:
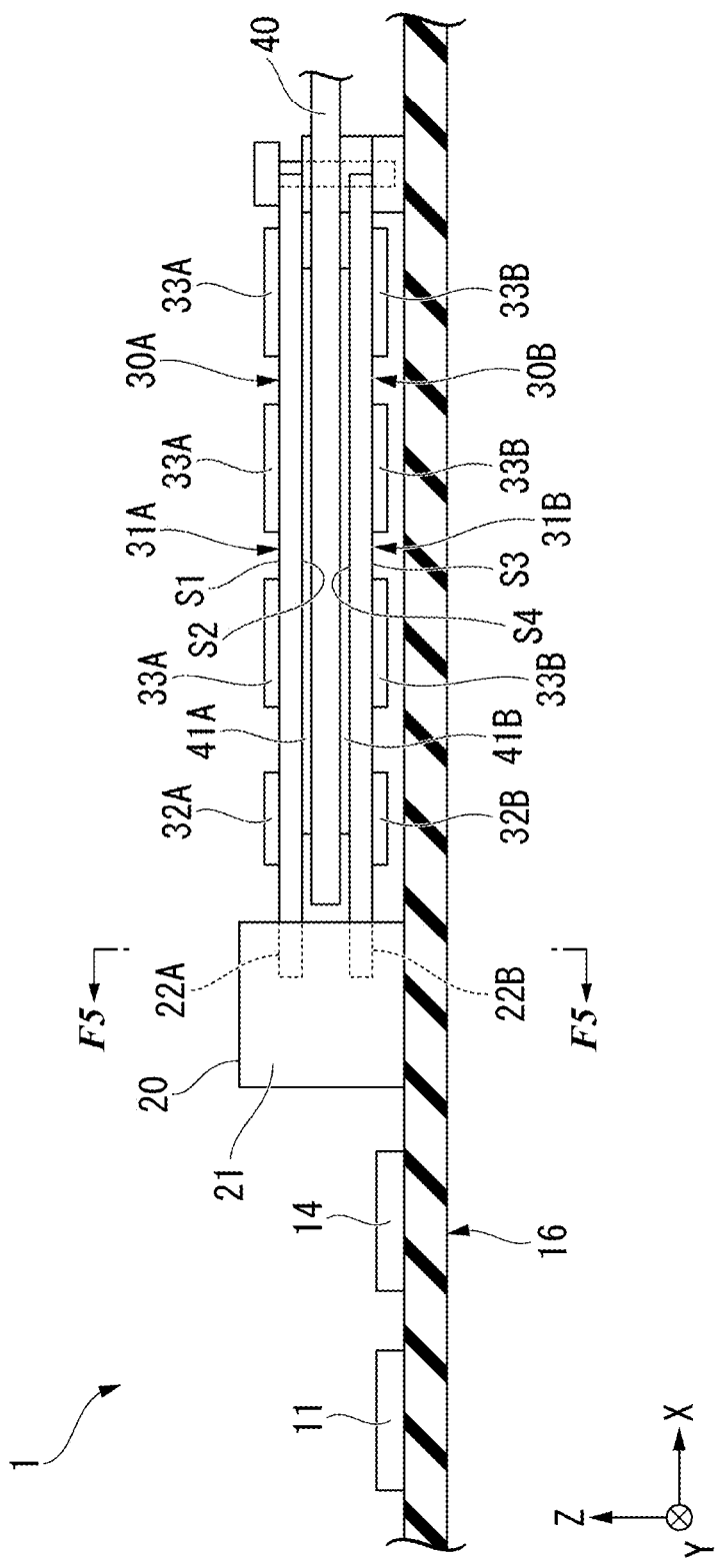
FIG. 4 is a cross-sectional view showing a part of the storage system according to the first embodiment.

FIG. 4 is a cross-sectional view showing a part of the storage system 1. Here, an X direction, a Y direction, and a Z direction are defined. Each of the X direction and the Y direction is parallel to the surface of the circuit board 16 to be described below. The X direction is a direction from the connector 20 toward the SSD module 30. The X direction is a length direction of the SSD module 30. The Y direction is a direction not parallel with the X direction (for example, a direction orthogonal to the X direction) and is a width direction of the SSD module 30. The Z direction is a direction not parallel with each of the X direction and the Y direction (for example, a direction orthogonal to each of the X direction and the Y direction). The Z direction is a direction from the circuit board 16 toward the connector 20 and is a thickness direction of the circuit board 16. The Y direction is an example of a "first direction". The Z direction is an example of a "second direction". Hereinbelow, for convenience of explanation, when viewed from the SSD module 30 connected to the connector 20, a direction of separation from the circuit board 16 is defined as "upward", and a direction of approaching the circuit board 16 is defined as "downward". However, these definitions do not specify a direction of gravity.

In the embodiment, the first SSD module 30A is inserted into the connector 20 in a posture in which the first surface S1 of the first substrate 31A is directed upward and the second surface S2 is directed downward. On the other hand, the second SSD module 30B is inserted into the connector 20 in a posture inverted with respect to the first SSD module 30A (posture rotated upside down). That is, the second SSD module 30B is inserted into the connector 20 in a posture in which the third surface S3 of the second substrate 31B is directed downward and the fourth surface S4 is directed upward. In other words, the first SSD module 30A and the second SSD module 30B are attached to the connector 20 such that the second surface S2 of first substrate 31A faces the fourth surface S4 of the second substrate 31B. Each of the second surface S2 and the fourth surface S4 is a surface on which the memory controller 32 and the semiconductor memory 33 are not mounted.

4. Other Configuration of Storage System

As shown in FIG. 4, in addition to the above-described host controller 11, the host bridge 14, the connector 20, the first SSD module 30A, and the second SSD module 30B, the storage system 1 includes the circuit board 16, a heat radiation member 40, a first heat conduction member 41A, and a second heat conduction member 41B.

The circuit board 16 is, for example, a motherboard of the storage system 1. The circuit board 16 has an insulator such as a glass epoxy resin and a wiring pattern provided in an inner layer and on an outer layer of the insulator. The wiring pattern includes a plurality of wirings electrically connecting the host bridge 14 and the connector 20 and a plurality of wirings electrically connecting the power supply circuit 15 and the connector 20.

The heat dissipation member 40 is located between the first SSD module 30A and the second SSD module 30B in the Z direction. The heat dissipation member 40 may be a heat sink having a plurality of fins, a heat pipe connected to the heat sink, or a water-cooled heat dissipation device to which cooling water is supplied from a cooling water supply device.

The first heat conduction member 41A is provided between the first substrate 31A of the first SSD module 30A and the heat dissipation member 40. The first heat conduction member 41A is in contact with the second surface S2 of the first substrate 31A of the first SSD module 30A and the heat dissipation member 40. The second heat conduction member 41B is provided between the second substrate 31B of the second SSD module 30B and the heat dissipation member 40. The second heat conduction member 41B is in contact with the fourth surface S4 of the second substrate 31B of the second SSD module 30B and the heat dissipation member 40.

5. Connector

<5.1 Placement and Arrangement of Terminal Group>

Next, the connector 20 will be particularly described. The connector 20 is a multi-stage connector. For example, the connector 20 is a two-stage connector. The connector 20 includes, for example, a connector case 21, a first slot 22A, and a second slot 22B. The connector case 21 is made of an insulating resin member or the like. The connector case 21 forms an outer shell of the connector 20. The connector case 21 supports a plurality of terminals 51, 52, 53, and 54 respectively included in four terminal groups TG1, TG2, TG3, and TG4 to be described below with reference to FIG. 5.

The first slot 22A and the second slot 22B are insertion parts provided in the connector case 21. Each of the first slot 22A and the second slot 22B is open in the X direction and extends in the Y direction. Each of the first slot 22A and the second slot 22B is, for example, a slot conforming to the M.2 standard. The first slot 22A and the second slot 22B are provided at different heights in the Z direction and are separated from each other in the Z direction. In the embodiment, the second slot 22B is located between the first slot 22A and the circuit board 16 in the Z direction. The terminal part 34 of the first SSD module 30A is detachably inserted into the first slot 22A. The terminal part 34 of the second SSD module 30B is detachably inserted into the second slot 22B.

Figure 5:
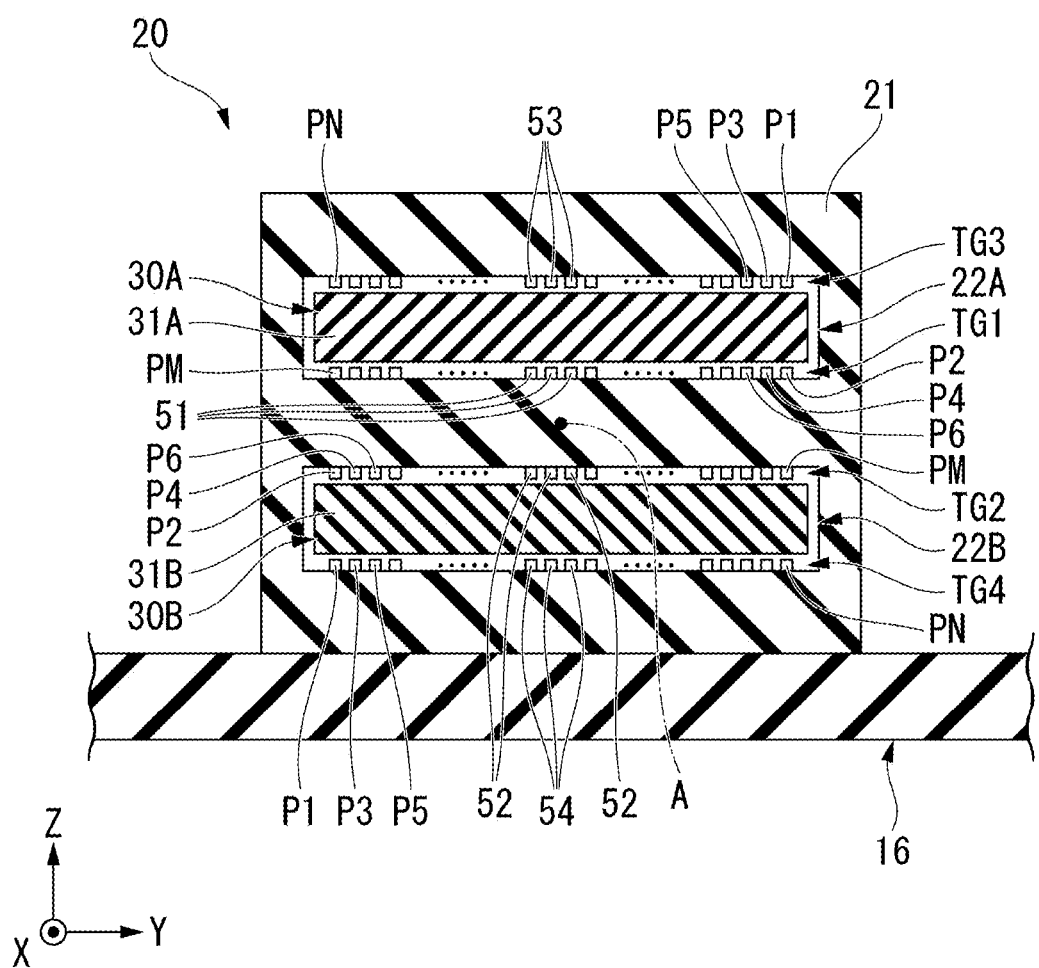
FIG. 5 is a cross-sectional view taken along line F5-F5 of a configuration shown in FIG. 4.

FIG. 5 is a cross-sectional view taken along line F5-F5 shown in FIG. 4. The first slot 22A has the first terminal group TG1 and the third terminal group TG3. The first terminal group TG1 is located below (on the second surface S2 side of) the first substrate 31A of the first SSD module 30A inserted into the first slot 22A. The first terminal group TG1 has the plurality of the terminals 51 aligned in the Y direction. The plurality of the terminals 51 are in contact with the terminal part 34 of the first SSD module 30A from below (second surface S2 side). The plurality of the terminals 51 are connected to the plurality of the terminals 35n included in the terminal part 34.

The third terminal group TG3 is located above (on the first surface S1 side of) the first substrate 31A of the first SSD module 30A inserted into the first slot 22A. In other words, the first substrate 31A of the first SSD module 30A is inserted between the first terminal group TG1 and the third terminal group TG3. The third terminal group TG3 has the plurality of the terminals 53 aligned in the Y direction. The plurality of the terminals 53 are in contact with the terminal part 34 of the first SSD module 30A from above (first surface S1 side). The plurality of the terminals 53 are connected to the plurality of the terminals 35m included in the terminal part 34.

The second slot 22B has the second terminal group TG2 and the fourth terminal group TG4. The second terminal group TG2 is located below (on the fourth surface S4 side of) the second substrate 31B of the second SSD module 30B inserted into the second slot 22B. The second terminal group TG2 has the plurality of the terminals 52 aligned in the Y direction. The plurality of the terminals 52 are in contact with the terminal part 34 of the second SSD module 30B from below (fourth surface S4 side). The plurality of the terminals 52 are connected to the plurality of the terminals 35n included in the terminal part 34.

The fourth terminal group TG4 is located above (on the third surface S3 side of) the second substrate 31B of the second SSD module 30B inserted into the second slot 22B. In other words, the second substrate 31B of the second SSD module 30B is inserted between the second terminal group TG2 and the fourth terminal group TG4. The fourth terminal group TG4 has the plurality of the terminals 54 aligned in the Y direction. The plurality of the terminals 54 are in contact with the terminal part 34 of the second SSD module 30B from above (third surface S3 side). The plurality of the terminals 54 are connected to the plurality of the terminals 35m included in the terminal part 34.

In the embodiment, the second slot 22B has terminal arrangement (or signal arrangement) that is inverted (rotated) so as to be upside down with respect to the first slot 22A. The term "inverted (rotated)" means that, for example, the second slot 22B is rotationally symmetrical to the first slot 22A with respect to an ideal axis line A serving as a center. The ideal axis line A is parallel to an insertion direction of the first SSD module 30A into the first slot 22A. The term "terminal arrangement" means arrangement (that is, an arrangement order) of a plurality of functions (power supply, ground, and various signals) of the wirings assigned to a plurality of terminals. The same signal is assigned to the first terminal group TG1 and the second terminal group TG2. Furthermore, the same signal is assigned to the third terminal group TG3 and the fourth terminal group TG4.

More specifically, the plurality of the terminals 51 included in the first terminal group TG1 are connected to the plurality of the terminals 52 included in the second terminal group TG2 via a plurality of wirings on the circuit board 16 (for example, wirings 100, 110, and 120 shown in FIG. 8) such that the first terminal group TG1 is reverse to the second terminal group TG2 in terminal arrangement order in the Y direction except for a part of the terminals to be described below.

In the example shown in FIG. 5, terminal numbers (pin numbers) of P2, P4, P6, . . . , PM (M is any even number) are assigned to the plurality of the terminals 51 of the first terminal group TG1 from the right side in FIG. 5. On the other hand, terminal numbers (pin numbers) of P2, P4, P6, . . . , PM are assigned to the plurality of the terminals 52 of the second terminal group TG2 from the left side in FIG. 5. In the first terminal group TG1 and the second terminal group TG2, the same function of the wiring (for example, the same signal) is assigned to the terminals having the same terminal number (same pin number). However, in the embodiment, functions (for example, signals) assigned to some of the terminals 52 included in the second terminal group TG2 are exceptionally changed to each other. The functions will be described in detail below.

Furthermore, in the embodiment, the plurality of the terminals 53 included in the third terminal group TG3 are connected to the plurality of the terminals 54 included in the fourth terminal group TG4 via a plurality of wirings on the circuit board 16 (for example, wirings 100, 110, and 120 shown in FIG. 8) such that the third terminal group TG3 is reverse to the fourth terminal group TG4 in terminal arrangement order in the Y direction.

In the example shown in FIG. 5, terminal numbers (pin numbers) of P1, P3, P5, . . . , PN (N is any odd number) are assigned to the plurality of the terminals 53 of the third terminal group TG3 from the right side in FIG. 5. On the other hand, terminal numbers (pin numbers) of P1, P3, P5, . . . , PN are assigned to the plurality of the terminals 54 of the fourth terminal group TG4 from the left side in FIG. 5. In the third terminal group TG3 and the fourth terminal group TG4, the same function of the wiring (for example, the same signal) is assigned to the terminals having the same terminal number (same pin number).

Figure 6:
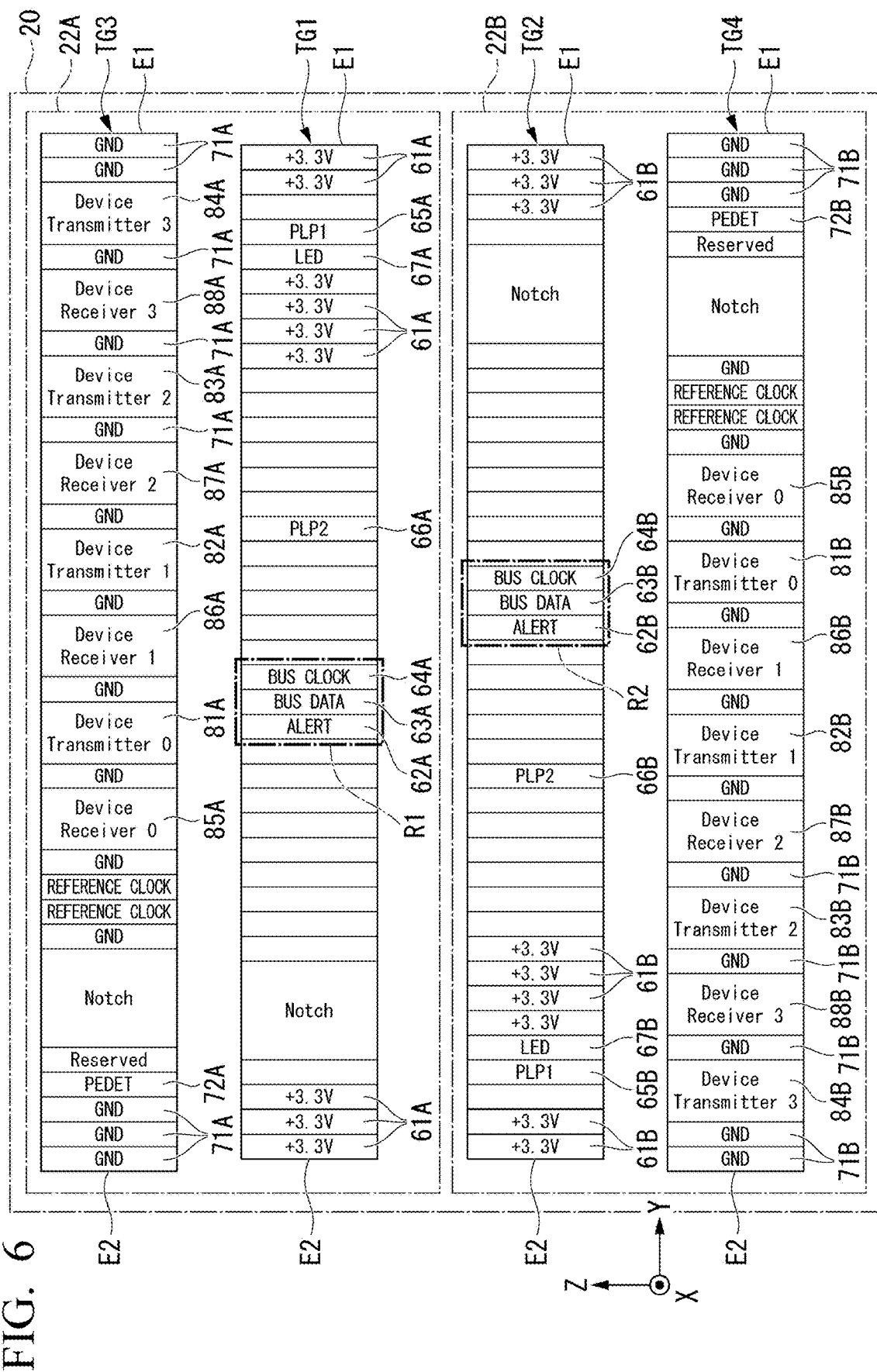
FIG. 6 is a diagram showing terminal arrangements of four terminal groups according to the first embodiment.

FIG. 6 is a diagram showing terminal arrangements of the four terminal groups TG1, TG2, TG3, and TG4. Here, each of the four terminal groups TG1, TG2, TG3, and TG4 has a first end portion E1 and a second end portion E2 located on a side opposite to the first end portion E1 in the Y direction. The term "end portion" means, for example, a region in the first terminal group TG1 in which one terminal 51 (or two terminals 51) exists from an end in the Y direction. This definition is the same for the second, third, and fourth terminal groups TG2, TG3, and TG4.

<First Terminal Group>

The plurality of the terminals 51 of the first terminal group TG1 include, for example, a plurality of power supply terminals 61A, an alert signal terminal 62A, a bus data terminal 63A, a bus clock terminal 64A, a first PLP (Power Loss Protection) signal terminal 65A, a second PLP signal terminal 66A, and a state signal terminal 67A.

The power supply terminal 61A is a terminal through which power is supplied to the first SSD module 30A. The power supply terminal 61A is provided at at least one of the first end portion E1 and the second end portion E2 of the first terminal group TG1.

The alert signal terminal 62A is a terminal configured to allow an alert signal indicating warning or a particular notice to transmit therethrough when the first SSD module 30A is in a particular state previously set.

The bus data terminal 63A is a terminal configured to allow a signal including address information to transmit therethrough. The address information specifies one of the first SSD module 30A and the second SSD module 30B. The term "address information" referred to here may be address information indicating a signal transmission destination or address information indicating a signal transmission source. For example, a specific command with address information of a transmission destination destined for the first SSD module 30A or the second SSD module 30B is transmitted to the bus data terminal 63A. The specific command is a command different from the request for writing of data or reading of data with respect to the SSD module 30. The specific command is, for example, a command for requesting temperature information of the SSD module 30. In addition, as a response to the specific command, a data signal (for example, a signal indicating a temperature information of the SSD module 30) of the SSD module 30 of the transmission source is transmitted to the bus data terminal 63A. The aforementioned data signal is a signal indicating data for response to the received command.

The bus clock terminal 64A is a terminal configured to allow a clock signal to transmit therethrough. The clock signal is used for reading the data signal transmitting through the bus data terminal 63A. The bus data terminal 63A and the bus clock terminal 64A are terminals used as a system management bus (SM bus) in, for example, a PCIe standard or a SATA standard.

The first PLP signal terminal 65A is a terminal configured to allow a particular signal (hereinafter, referred to as a "first PLP signal") to transmit therethrough. The particular signal is output from the host controller 11 to the first SSD module 30A when the power supply to the first SSD module 30A is cut off. The first PLP signal is a signal which changes when the power supply to the first SSD module 30A is cut off from the host device 10. For example, when the power supply to the first SSD module 30A is cut off, the host controller 11 changes, as the first PLP signal, a voltage maintained at a first voltage (for example, a high-level voltage) to a second voltage (for example, a low-level voltage) having a voltage level different from that of the first voltage. When detecting the first PLP signal of the second voltage, the first SSD module 30A performs, for example, data-saving processing for writing data temporarily stored in the first volatile memory 37A to the first semiconductor memory 33A.

The second PLP signal terminal 66A is a terminal configured to allow a particular signal (hereinafter, a "second PLP signal") to transmit therethrough. The particular signal is output from the first SSD module 30A to the host controller 11 when the data-saving processing of the first SSD module 30A is completed without failure. The second PLP signal is a signal which changes when the data-saving processing of the first SSD module 30A is completed without failure. For example, when starting the data-saving processing, the first SSD module 30A changes a voltage maintained at the first voltage (for example, a high-level voltage) to the second voltage (for example, a low-level voltage) having a voltage level different from that of the first voltage. When the data-saving processing is completed without failure, the first SSD module 30A returns the voltage maintained at the second voltage to the first voltage as the second PLP signal. As a result, the host controller 11 detects that the data-saving processing has been completed without failure. When the host controller 11 detects that the data-saving processing has been completed without failure, the host controller 11 cuts off the power supply to the first SSD module 30A.

The state signal terminal 67A is a terminal configured to allow a state signal to transmit therethrough. The state signal is output from the first SSD module 30A when the first SSD module 30A is in operation (for example, in the operation of writing of data, reading of data, or erasing of data), and the state signal indicates that the first SSD module 30A is in operation. For example, the state signal is maintained at the first voltage (for example, the high-level voltage) by the first SSD module 30A when the operation of the first SSD module 30A is stopped. On the other hand, the state signal is maintained at the second voltage (for example, the low-level voltage) having a voltage level different from that of the first voltage by the first SSD module 30A when the first SSD module 30A is in operation. When the voltage level of the state signal terminal 67A is maintained at the second voltage, the host controller 11 notifies the outside that the SSD module 30 is in operation by lighting the LED 13a of the notification device 13.

<Second Terminal Group>

Similarly to the first terminal group TG1, the second terminal group TG2 includes, for example, a plurality of power supply terminals 61B, an alert signal terminal 62B, a bus data terminal 63B, a bus clock terminal 64B, a first PLP signal terminal 65B, a second PLP signal terminal 66B, and a state signal terminal 67B.

The power supply terminal 61B is a terminal through which power is supplied to the second SSD module 30B. The power supply terminal 61B is provided at at least one of the first end portion E1 and the second end portion E2 of the second terminal group TG2.

The alert signal terminal 62B is a terminal configured to allow an alert signal indicating warning or a particular notice to transmit therethrough when the second SSD module 30B is in a particular state previously set. In the embodiment, the alert signal transmitted through the alert signal terminal 62B is a signal having the same specification as the alert signal transmitted through the alert signal terminal 62A. The alert signal is an example of "signal notifying a particular state".

The bus data terminal 63B is a terminal configured to allow a signal including address information to transmit therethrough. The address information specifies one of the first SSD module 30A and the second SSD module 30B. For example, a specific command with address information of a transmission destination destined for the first SSD module 30A or the second SSD module 30B is transmitted to the bus data terminal 63B. In addition, as a response to the specific command, a data signal with address information of the SSD module 30 of the transmission source is transmitted to the bus data terminal 63B. Hereinbelow, a signal passing through the bus data terminal 63A or the bus data terminal 63B may be referred to as "bus data signal".

The bus clock terminal 64B is a terminal configured to allow a clock signal to transmit therethrough. The clock signal is used for reading the data signal transmitting through the bus data terminal 63B. The bus data terminal 63B and the bus clock terminal 64B are terminals used as a SM bus in, for example, a PCIe standard or a SATA standard. In the embodiment, the clock signal transmitted through the bus clock terminal 64B is a signal having the same specification as the clock signal transmitted through the bus clock terminal 64A.

Here, in the embodiment, the setting of the arrangement order in the Y direction (refer to dashed-dotted line R1 shown in FIG. 6) of the alert signal terminal 62A, the bus data terminal 63A, and the bus clock terminal 64A which are included in the first terminal group TG1 are the same as the setting of the arrangement order in the Y direction (refer to dashed-dotted line R2 shown in FIG. 6) of the alert signal terminal 62B, the bus data terminal 63B, and the bus clock terminal 64B which are included in the second terminal group TG2.

Regarding the terminals of the connector 20, the alert signal terminal 62A is an example of "first terminal", the bus clock terminal 64A is an example of "second terminal, the alert signal terminal 62B is an example of "third terminal", and the bus clock terminal 64B is an example of "fourth terminal". Each of the alert signal transmitted through the alert signal terminal 62A and the alert signal transmitted through the alert signal terminal 62B is an example of "first signal". Each of the clock signal transmitted through the bus clock terminal 64A and the clock signal transmitted through the bus clock terminal 64B is an example of "second signal". Each of the bus data signal transmitted through the bus data terminal 63A and the bus data signal transmitted through the bus data terminal 63B is an example of "third signal".

The first PLP signal terminal 65B is a terminal configured to allow the first PLP signal to transmit therethrough. The first PLP signal is output from the host controller 11 to the second SSD module 30B when the power supply to the second SSD module 30B is cut off. In the embodiment, the first PLP signal transmitted through the first PLP signal terminal 65B is a signal having the same specification as the first PLP signal transmitted through the first PLP signal terminal 65A. The first PLP signal is another example of "signal notifying a particular state".

The second PLP signal terminal 66B is a terminal configured to allow the second PLP signal to transmit therethrough. The second PLP is output from the second SSD module 30B to the host controller 11 when the data-saving processing of the second SSD module 30B is completed without failure. In the embodiment, the second PLP signal transmitted through the second PLP signal terminal 66B is a signal having the same specification as the second PLP signal transmitted through the second PLP signal terminal 66A. The second PLP signal is another example of "signal notifying a particular state".

The state signal terminal 67B is a terminal configured to allow a state signal to transmit therethrough. The state signal is output from the second SSD module 30B when the second SSD module 30B is in operation (for example, in the operation of writing of data, reading of data, or erasing of data), and the state signal indicates that the second SSD module 30B is in operation. In the embodiment, the state signal output from the state signal terminal 67B to the host controller 11 is a signal having the same specification as the state signal output from the state signal terminal 67A to the host controller 11.

<Third Terminal Group>

The third terminal group TG3 includes a plurality of ground terminals 71A, a PEDET terminal 72A, a first transmission terminal 81A, a second transmission terminal 82A, a third transmission terminal 83A, a fourth transmission terminal 84A, a first reception terminal 85A, a second reception terminal 86A, a third reception terminal 87A, and a fourth reception terminal 88A. Hereinbelow, these terminals are referred to as "first to fourth transmission terminals 81A to 84A" and "first to fourth reception terminals 85A to 88A".

Each ground terminal 71A is a terminal connected to the ground of the first substrate 31A of the first SSD module 30A. The ground terminal 71A is provided at at least one of the first end portion E1 and the second end portion E2 of the third terminal group TG3.

The PEDET terminal 72A is an identification terminal used for the host controller 11 that determines a standard of the SSD module 30 connected to the first slot 22A. In the embodiment, the PEDET terminal 72A is also an identification terminal used to determine whether the posture of the first SSD module 30A inserted into the second slot 22A is an upward posture or a downward posture. The term "determination as to whether the posture is an upward posture or a downward posture" means to determine whether the posture of the SSD module 30 with respect to the connector 20 is an upward posture such as the first SSD module 30A shown in FIG. 4 or a downward posture such as the second SSD module 30B shown in FIG. 4. The PEDET terminal 72A is an example of "fifth terminal". The PEDET terminal 72A will be described in detail below.

Each of the first to fourth transmission terminals 81A to 84A is a terminal through which write data to be written to the first SSD module 30A is transmitted from the host device 10 to the first SSD module 30A. Each of the first to fourth reception terminals 85A to 88A is a terminal through which read data read out from the first SSD module 30A is transmitted from the first SSD module 30A to the host device 10. The first to fourth transmission terminals 81A to 84A and the first to fourth reception terminals 85A to 88A are terminals corresponding to lanes of a PCIe standard, for example.

<Fourth Terminal Group>

Similarly to the third terminal group TG3, the fourth terminal group TG4 includes a plurality of ground terminals 71B, a PEDET terminal 72B, a first transmission terminal 81B, a second transmission terminal 82B, a third transmission terminal 83B, a fourth transmission terminal 84B, a first reception terminal 85B, a second reception terminal 86B, a third reception terminal 87B, and a fourth reception terminal 88B. Hereinbelow, these terminals are referred to as "first to fourth transmission terminals 81B to 84B" and "first to fourth reception terminals 85B to 88B".

Each ground terminal 71B is a terminal connected to the ground of the second substrate 31B of the second SSD module 30B. The ground terminal 71B is provided at at least one of the first end portion E1 and the second end portion E2 of the fourth terminal group TG4.

The PEDET terminal 72B is also an identification terminal used to determine whether the posture of the second SSD module 30B inserted into the second slot 22B is an upward posture or a downward posture. The PEDET terminal 72B is located at a position rotationally symmetrical to the PEDET terminal 72A of the second terminal group TG2 with respect to the above-mentioned ideal axis line A serving as the center. The PEDET terminal 72B is an example of "sixth terminal". The PEDET terminal 72B will be described in detail below.

Each of the first to fourth transmission terminals 81B to 84B is a terminal through which write data to be written to the second SSD module 30B is transmitted from the host device 10 to the second SSD module 30B. Each of the first to fourth reception terminals 85B to 88B is a terminal through which read data read out from the second SSD module 30B is transmitted from the second SSD module 30B to the host device 10. The first to fourth transmission terminals 81B to 84B and the first to fourth reception terminals 85B to 88B are terminals corresponding to lanes of a PCIe standard, for example.

<5.2 Connection Relationship Between Terminal Group and Circuit Board>

Figure 7:
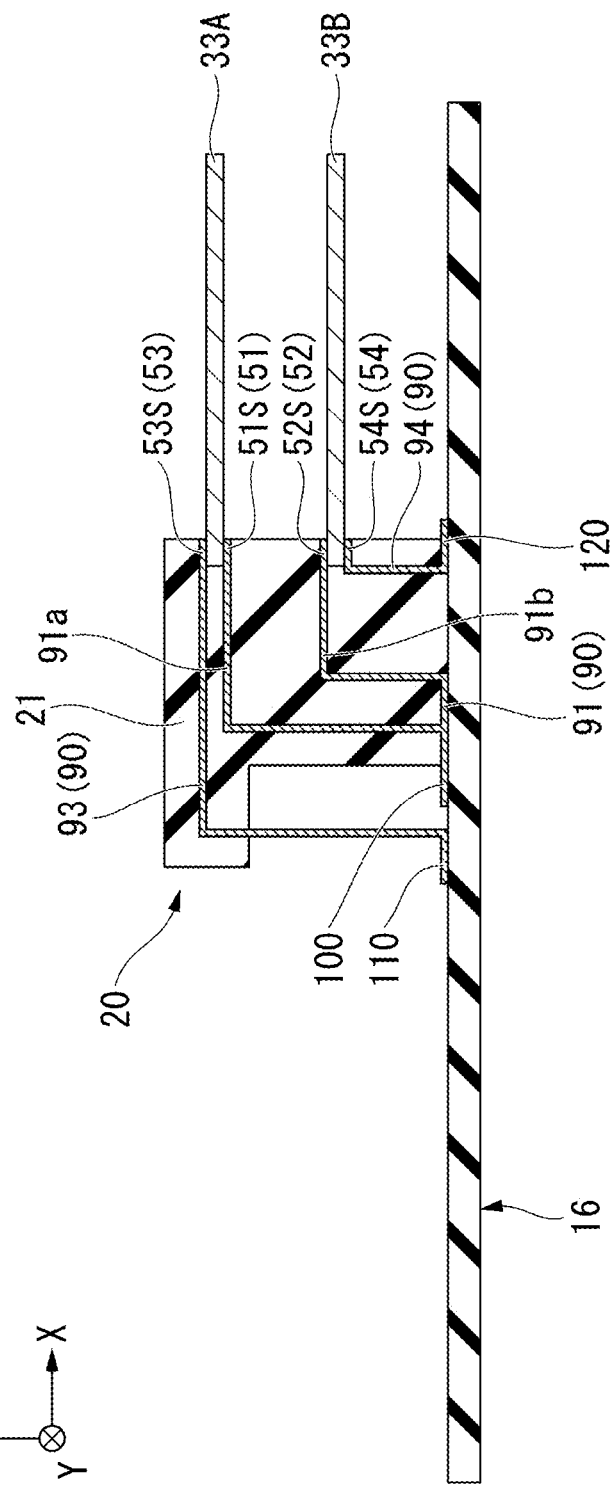
FIG. 7 is a cross-sectional view showing a circuit board and a connector according to the first embodiment.

FIG. 7 is a cross-sectional view showing the circuit board 16 and the connector 20. The connector 20 has a plurality of conductive portions 90 that connect the circuit board 16 to the plurality of the terminals 51, 52, 53, and 54 included in the first to fourth terminal groups TG1, TG2, TG3, and TG4, respectively. For example, the conductive portion 90 is formed integrally with the corresponding terminals 51, 52, 53, and 54. The conductive portion 90 extends from the terminals 51, 52, 53, and 54 toward the circuit board 16 inside the connector case 21.

In the embodiment, the plurality of the conductive portions 90 include conductive portions 91 that correspond to a first specific terminal 51S included in the first terminal group TG1 and a second specific terminal 52S included in the second terminal group TG2. The conductive portion 91 corresponding to the first specific terminal 51S may be referred to as "first conductive portion 91". The conductive portion 91 corresponding to the second specific terminal 52S may be referred to as "second conductive portion 91". The conductive portion 91 includes a conductive portion 91a connected to the first specific terminal 51S and a conductive portion 91b connected to the second specific terminal 52S. The conductive portion 91 is connected to the circuit board 16. In other words, the conductive portion 91 is a conductive portion common to the first specific terminal 51S and the second specific terminal 52S. A common wiring 100 corresponding to the first specific terminal 51S and the second specific terminal 52S is provided on the circuit board 16. The conductive portion 91 is connected to the host bridge 14 or the power supply circuit 15 via the common wiring 100.

In the embodiment, examples of the set including the first specific terminal 51S and the second specific terminal 52S having the aforementioned connection relationship are as follows.

a set including the power supply terminal 61A of the first terminal group TG1 and the power supply terminal 61B of the second terminal group TG2.

a set including the alert signal terminal 62A of the first terminal group TG1 and the alert signal terminal 62B of the second terminal group TG2.

a set including the bus data terminal 63A of the first terminal group TG1 and the bus data terminal 63B of the second terminal group TG2.

a set including the bus clock terminal 64A of the first terminal group TG1 and the bus clock terminal 64B of the second terminal group TG2.

a set including the first PLP signal terminal 65A of the first terminal group TG1 and the first PLP signal terminal 65B of the second terminal group TG2.

a set including the second PLP signal terminal 66A of the first terminal group TG1 and the second PLP signal terminal 66B of the second terminal group TG2.

a set including the state signal terminal 67A of the first terminal group TG1 and the state signal terminal 67B of the second terminal group TG2.

Moreover, the above-mentioned plurality of the conductive portions 90 include a third conductive portion 93 connected to a third specific terminal 53S included in the third terminal group TG3 and a fourth conductive portion 94 connected to a fourth specific terminal 54S included in the fourth terminal group TG4. In the embodiment, the third conductive portion 93 and the fourth conductive portion 94 are insulated from each other and are separately connected to the circuit board 16. An individual wiring 110 for the third specific terminal 53S and an individual wiring 120 for the fourth specific terminal 54S are provided on the circuit board 16. The third conductive portion 93 is connected to the host bridge 14 via the individual wiring 110. The fourth conductive portion 94 is connected to the host bridge 14 via the individual wiring 120.

In the embodiment, as an example of the set including the third specific terminal 53S and the fourth specific terminal 54S having the aforementioned connection relationship, there is a set including the first transmission terminal 81A of the third terminal group TG3 and the first transmission terminal 81B of the fourth terminal group TG4. In this case, the third conductive portion 93 connected to the first transmission terminal 81A of the third terminal group TG3 and the fourth conductive portion 94 connected to the first transmission terminal 81B of the fourth terminal group TG4 are separately connected to the circuit board 16. The third conductive portion 93 and the fourth conductive portion 94 are connected to the host bridge 14 independently of each other via individual wirings 110 and 120. The same applies to the second to fourth transmission terminals 82A to 84A and the first to fourth reception terminals 85A to 88A of the third terminal group TG3, and to the second to fourth transmission terminals 82B to 84B and the first to fourth reception terminals 85B to 88B of the fourth terminal group TG4. Furthermore, as another example of the set including the third specific terminal 53S and the fourth specific terminal 54S, there is a set including the PEDET terminal 72A of the third terminal group TG3 and the PEDET terminal 72B of the fourth terminal group TG4.

Figure 8:
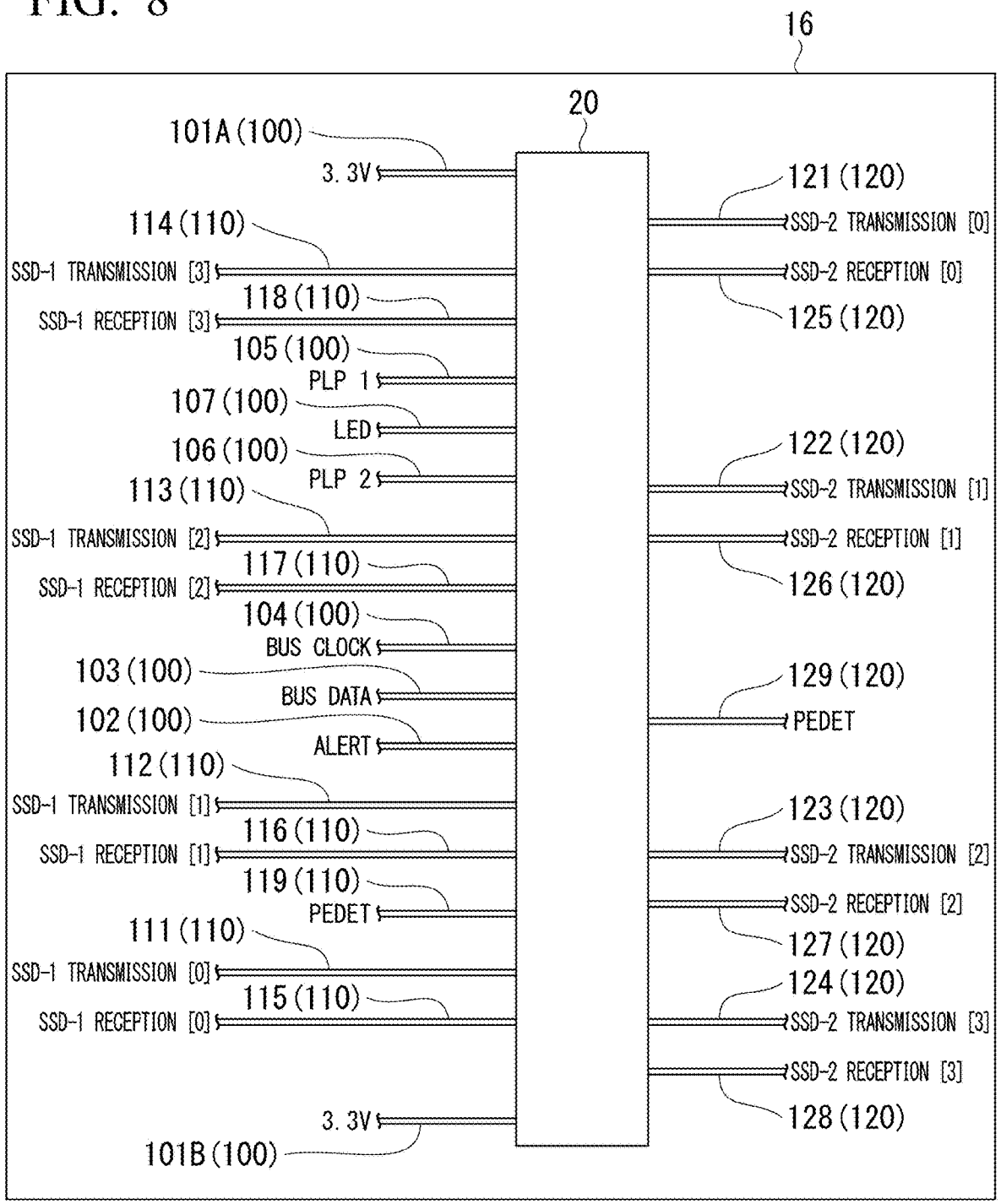
FIG. 8 is a plan view showing the circuit board and the connector according to the first embodiment.

FIG. 8 is a plan view showing the circuit board 16 and the connector 20. In the embodiment, the above-described wiring 100 includes an electric power line 101A, an electric power line 101B, a signal line 102, a signal line 103, a signal line 104, a signal line 105, a signal line 106, and a signal line 107.

The conductive portion 91 connected to the power supply terminal 61A of the first end portion E1 of the first terminal group TG1 and the power supply terminal 61B of the second end portion E2 of the second terminal group TG2 is connected to the power supply circuit 15 via the electric power line 101A. The conductive portion 91 connected to the power supply terminal 61A of the second end portion E2 of the first terminal group TG1 and the power supply terminal 61B of the first end portion E1 of the second terminal group TG2 is connected to the power supply circuit 15 via the electric power line 101B.

The conductive portion 91 connected to the alert signal terminal 62A and the alert signal terminal 62B is connected to the host bridge 14 via the signal line 102. The conductive portion 91 connected to the bus data terminal 63A and the bus data terminal 63B is connected to the host bridge 14 via the signal line 103. The conductive portion 91 connected to the bus clock terminal 64A and the bus clock terminal 64B is connected to the host bridge 14 via the signal line 104.

The conductive portion 91 connected to the first PLP signal terminal 65A and the first PLP signal terminal 65B is connected to the host bridge 14 via the signal line 105. The conductive portion 91 connected to the second PLP signal terminal 66A and the second PLP signal terminal 66B is connected to the host bridge 14 via the signal line 106. The conductive portion 91 connected to the state signal terminal 67A and the state signal terminal 67B is connected to the host bridge 14 via the signal line 107.

On the other hand, the transmission terminals 81A to 84A of the third terminal group TG3, the reception terminals 85A to 88A of the third terminal group TG3, the transmission terminals 81B to 84B of the fourth terminal group TG4, and the reception terminals 85B to 88B of the fourth terminal group TG4 are led out to the circuit board 16 in a state of being insulated from each other inside the connector 20 and are connected to the wirings (lanes) 111 to 114, 115 to 118, 121 to 124, and 125 to 128 provided on the circuit board 16 in a one-to-one manner, respectively. The wirings 111 to 118 and 121 to 128 are connected to the host bridge 14. Moreover, the PEDET terminal 72A is connected to the host bridge 14 via a wiring 119 provided on the circuit board 16. The PEDET terminal 72B is connected to the host bridge 14 via a wiring 129 provided on the circuit board 16.

<5.3 Terminal Arrangement of Second Terminal Group>

Figure 9:
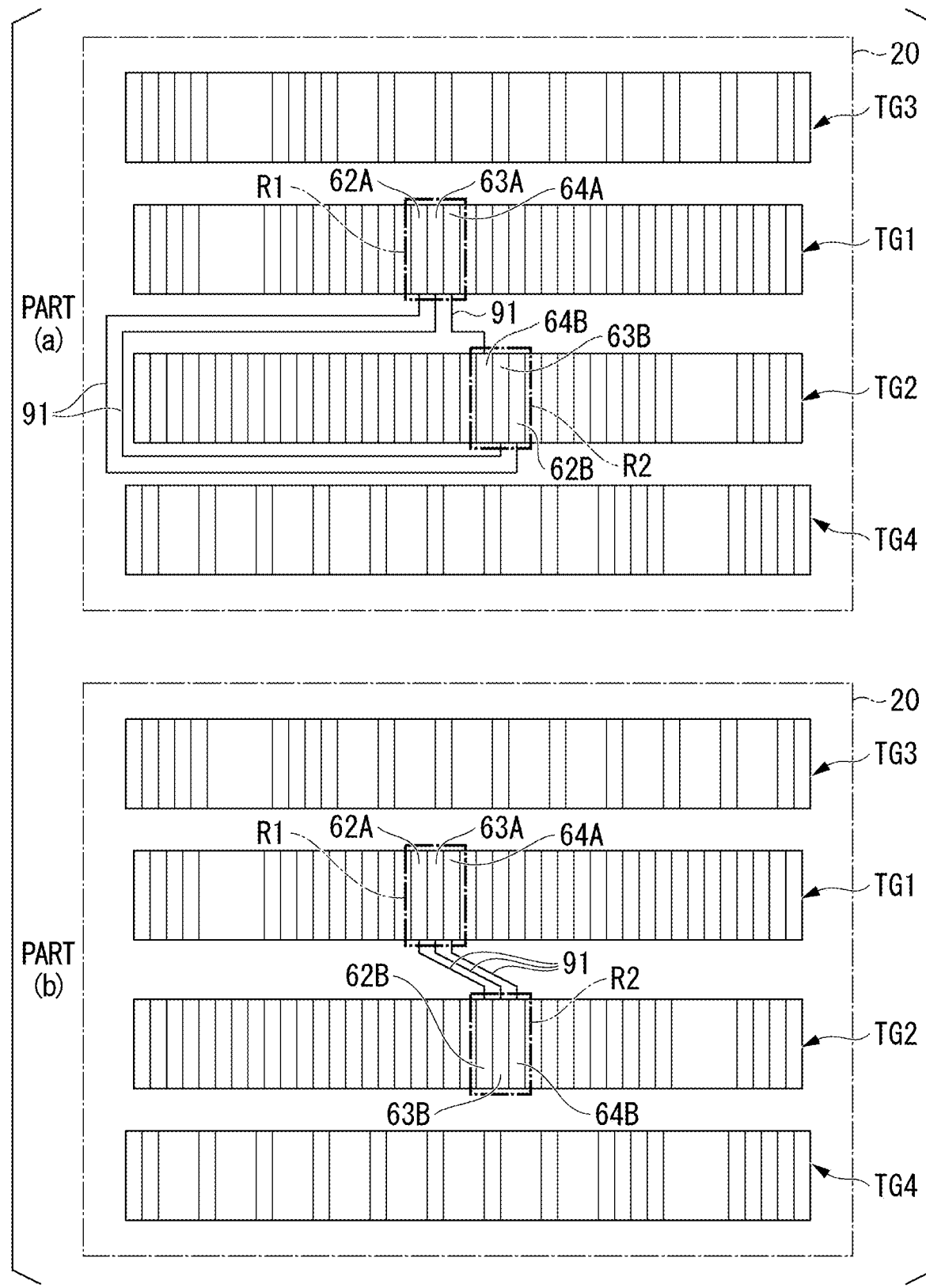
FIG. 9 is an explanatory view of terminal arrangements of second terminal groups of the first embodiment and the Comparative Example.

FIG. 9 is an explanatory view of terminal arrangements of second terminal groups TG2. PART (a) of FIG. 9 shows a Comparative Example. PART (b) of FIG. 9 shows the embodiment. As shown in PART (a) of FIG. 9, for example, the Comparative Example shows that a terminal arrangement of the first terminal group TG1 and a terminal arrangement of the second terminal group TG2 are in a complete rotational symmetrical relationship. In this configuration, the conductive portion 91 that connects the alert signal terminal 62A and the alert signal terminal 62B, the conductive portion 91 that connects the bus data terminal 63A and the bus data terminal 63B, and the conductive portion 91 that connects the bus clock terminal 64A and the bus clock terminal 64B are in a relationship of crossing each other. Consequently, for example, some of the conductive portions 91 are necessary to be wired so as to circumvent the second terminal group TG2, and therefore it is difficult to form all of the above-mentioned three conductive portions 91 with a short length.

In contrast to the above-mentioned Comparative Example, as shown in PART (b) of FIG. 9, although the terminal arrangement of the second terminal group TG2 is rotationally symmetrical to the terminal arrangement of the first terminal group TG1, the placement of the bus clock terminal 64B and the alert signal terminal 62B in the terminal arrangement of the second terminal group TG2 is changed so as to be different from those of PART (a) of FIG. 9. Specifically, in the direction from the left side to the right side in PART (a) of FIG. 9, the bus clock terminal 64B, the bus data terminal 63B, and the alert signal terminal 62B are arranged in this order in the second terminal group TG2. In contrast, in the direction from the left side to the right side in PART (b) of FIG. 9, the alert signal terminal 62B, the bus data terminal 63B, and the bus clock terminal 64B are arranged in this order in the second terminal group TG2. More specifically, the terminal arrangement of the alert signal terminal 62A, the bus data terminal 63A, and the bus clock terminal 64A of the first terminal group TG1 corresponds to the terminal arrangement of the alert signal terminal 62B, the bus data terminal 63B, and the bus clock terminal 64B of the second terminal group TG2 in the direction from the left side to the right side in PART (b) of FIG. 9. With this configuration, the conductive portion 91 that connects the alert signal terminal 62A and the alert signal terminal 62B, the conductive portion 91 that connects the bus data terminal 63A and the bus data terminal 63B, and the conductive portion 91 that connects the bus clock terminal 64A and the bus clock terminal 64B are not in a relationship of crossing each other. Accordingly, the lengths of the aforementioned three conductive portions 91 can be shorter than those of the configuration of the Comparative Example shown in PART (a) of FIG. 9.

6. Detection of Posture of SSD Module and Change of Signal

In the embodiment as described above, the arrangement of the bus clock terminal 64B and the alert signal terminal 62B of the second terminal group TG2 is changed with respect to those of the terminal arrangement of the first terminal group TG1. Therefore, the SSD module 30 inserted into the second slot 22B is necessary to detect that the SSD module 30 is connected to the connector 20 in the downward posture and is necessary to change some of the signals inside the SSD module 30 so as to correspond to the arrangement of the bus clock terminal 64B and the alert signal terminal 62B according to the embodiment. Hereinbelow, such detection and change will be particularly described.

<6.1 Detection of Posture of SSD Module>

Figure 10:
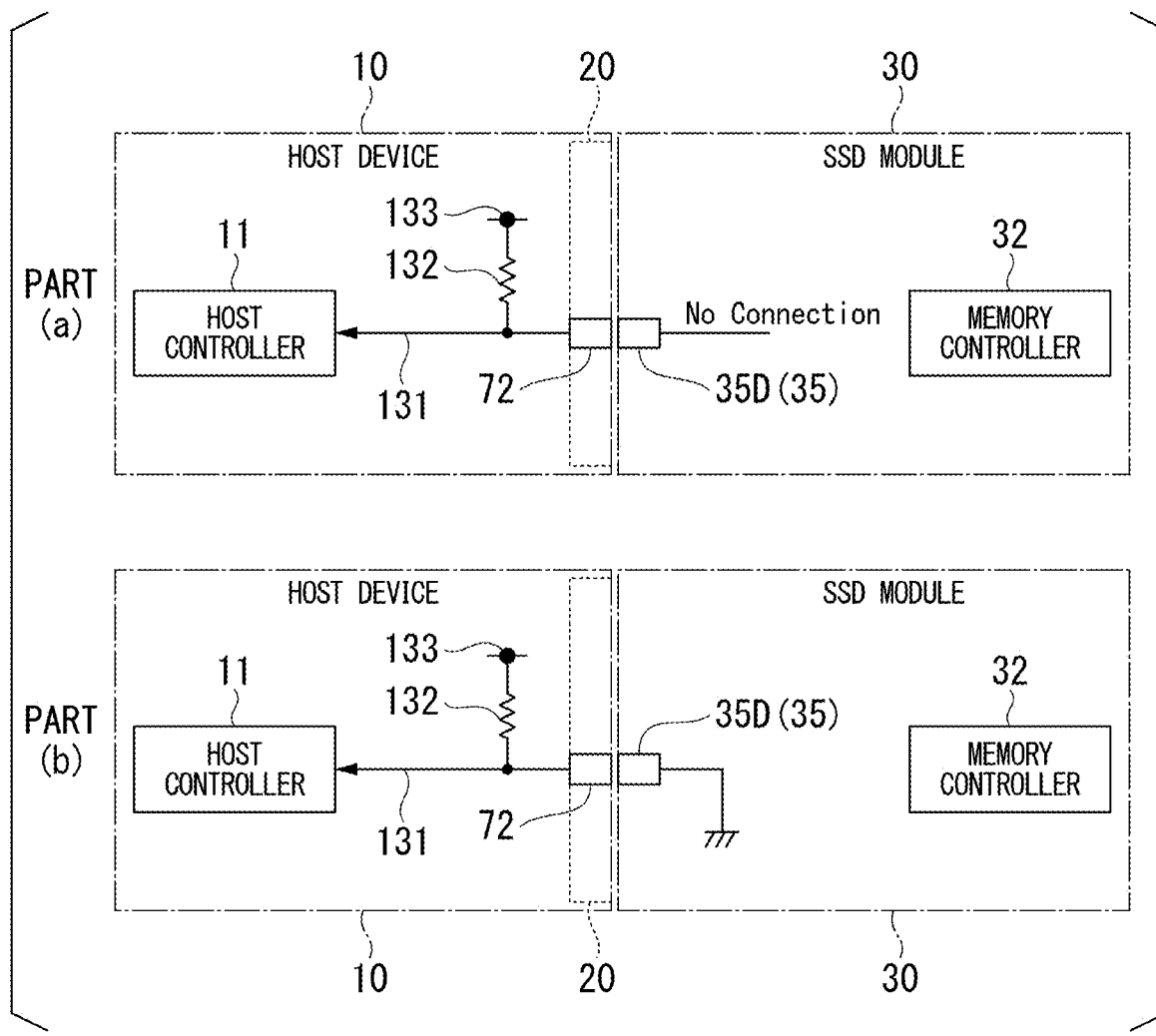
FIG. 10 is an explanatory view of a method of using a PEDET terminal of the Comparative Example in the first embodiment.

FIG. 10 is an explanatory view of a method of using a PEDET terminal 72 according to the Comparative Example. In the method shown in FIG. 10, the host device 10 includes a signal line 131 that connects the PEDET terminal 72 and the host controller 11. A voltage is applied from a power supply 133 of the host device 10 to the signal line 131 via a pull-up resistor 132.

PART (a) of FIG. 10 shows a state in which the SSD module 30 conforming to a first standard (for example, a PCIe standard) is connected to the connector 20. The terminal 35 of the SSD module 30 includes a terminal 35D connected to the PEDET terminal 72. In the SSD module 30 conforming to the first standard, the terminal 35D is in an open state. Consequently, when the SSD module 30 conforming to the first standard is connected to the connector 20, a first voltage signal (for example, a high-level voltage) is input to the host controller 11 from the PEDET terminal 72.

On the other hand, PART (b) of FIG. 10 shows a state in which the SSD module 30 conforming to a second standard (for example, a SATA standard) different from the first standard is connected to the connector 20. In the SSD module 30 conforming to the second standard, the terminal 35D is connected to a ground of the SSD module 30. Consequently, when the SSD module 30 conforming to the second standard is connected to the connector 20, a second voltage signal (for example, a low-level voltage) is input to the host controller 11 from the PEDET terminal 72. Accordingly, in accordance with the signal input from the PEDET terminal 72, the host controller 11 can determine whether the SSD module 30 connected to the connector 20 is the SSD module 30 conforming to the first standard or the SSD module 30 conforming to the second standard.

Figure 11:
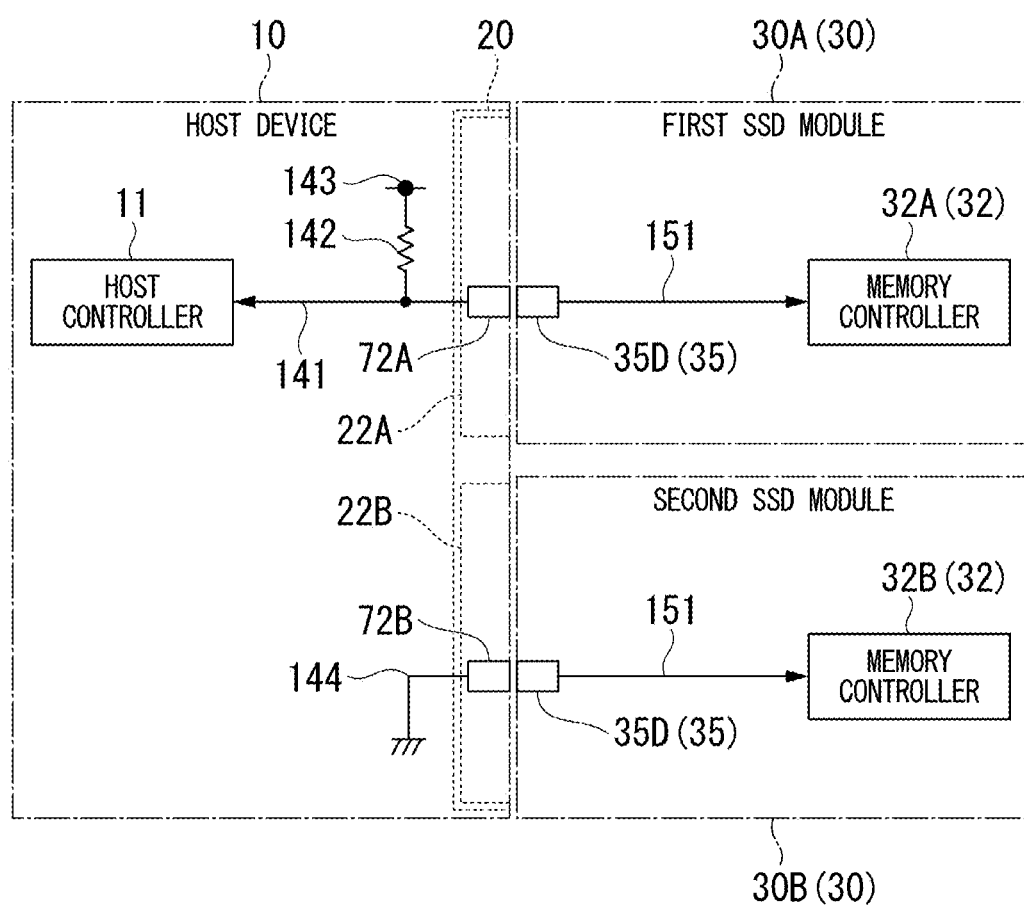
FIG. 11 is an explanatory view of a method of using a PEDET terminal according to the first embodiment.

FIG. 11 is an explanatory view of a method of using the PEDET terminal 72A and the PEDET terminal 72B according to the embodiment. Note that, in the embodiment, an example will be described in which the host controller 11 determines whether or not the SSD module 30 connected to the connector 20 is the SSD module 30 conforming to the first standard (for example, a PCIe standard), and in a case in which the host controller 11 determines that the SSD module 30 is not the SSD module 30 conforming to the first standard, the host controller 1 outputs an error state notification.

In the embodiment, with respect to the first slot 22A, the host device 10 includes a signal line 141 that connects the PEDET terminal 72A and the host controller 11. A voltage is applied to the signal line 141 via a pull-up resistor 142 from a power supply 143 inside the host device 10. On the other hand, with respect to the second slot 22B, the host device 10 includes a signal line 144 that connects the PEDET terminal 72B and a ground inside the host device 10. The SSD module 30 connected to the first slot 22A or the second slot 22B includes a signal line 151. The signal line 151 connects the memory controller 32 of the SSD module 30 and the terminal 35D. The terminal 35D is connected to the PEDET terminal 72A or the PEDET terminal 72B.

When the SSD module 30 is connected to the first slot 22A, a first voltage signal (for example, a high-level voltage) is input to the host controller 11 from the PEDET terminal 72A. When the first voltage signal is input from a PEDET terminal 72A to the host controller 11, the host controller 11 determines that the SSD module 30 connected to the first slot 22A is the SSD module 30 conforming to the first standard. On the other hand, when the second voltage signal (for example, the low-level voltage) is input to the host controller 11 from the PEDET terminal 72A, the host controller 11 determines that the SSD module 30 connected to the first slot 22A is not the SSD module 30 conforming to the first standard.

In the embodiment, when the SSD module 30 is connected to the first slot 22A, the first voltage signal is input to the memory controller 32 of the SSD module 30 from the terminal 35D connected to the PEDET terminal 72A. When the first voltage signal is input from the terminal 35D to the memory controller 32, the memory controller 32 determines that the SSD module 30 is in the upward posture (for example, the first surface S1 of the first substrate 31A has a posture being directed upward).

On the other hand, when the SSD module 30 is connected to the second slot 22B, the second voltage signal is input to the memory controller 32 of the SSD module 30 from the terminal 35D connected to a PEDET terminal 72B. When the second voltage signal is input from the terminal 35D to the memory controller 32, the memory controller 32 determines that the SSD module 30 is in the downward posture (for example, the third surface S3 of the second substrate 31B has a posture being directed downward). The terminal 35D connected to the PEDET terminal 72A or the PEDET terminal 72B is an example of "third terminal" of the SSD module 30. The first voltage signal is an example of "first level signal". The second voltage signal is an example of "second level signal". "The signal input from the terminal 35D is the first voltage signal" is an example of "satisfy a first condition". "The signal input from the terminal 35D is the second voltage signal" is an example of "satisfy a second condition".

<6.2 Change of Signal of SSD Module>

Figure 12:
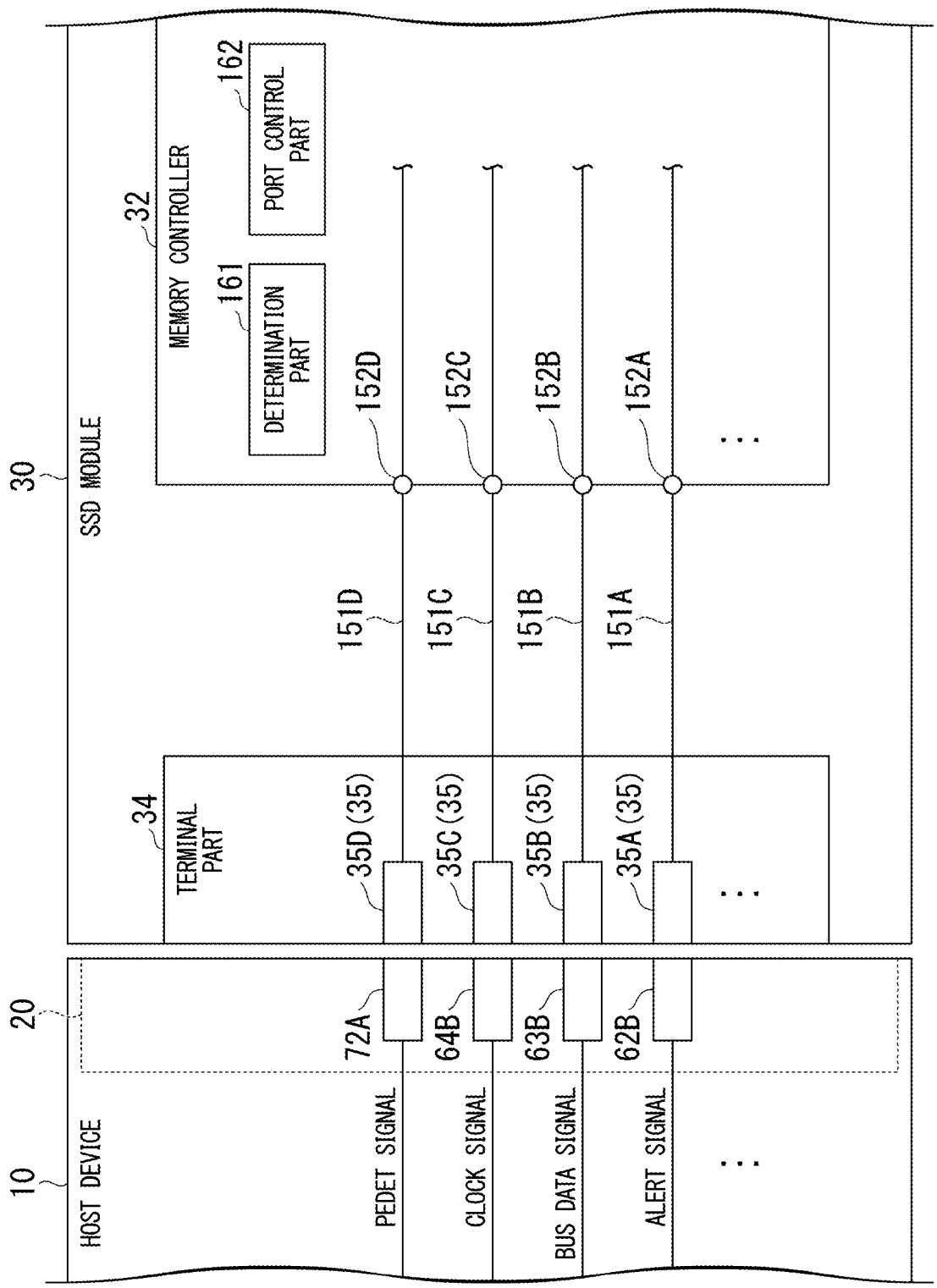
FIG. 12 is a block diagram showing another part of a functional configuration of the storage system according to the first embodiment.

FIG. 12 is a block diagram showing part of a functional configuration of the storage system 1. In the embodiment, the plurality of the terminals 35 of the SSD module 30 includes a terminal 35A, a terminal 35B, and a terminal 35C in addition to the aforementioned terminal 35D. The terminal 35A is a terminal connected to the alert signal terminal 62B of the second slot 22B when the SSD module 30 is inserted into the second slot 22B. The terminal 35B is a terminal connected to the bus data terminal 63B of the second slot 22B when the second SSD module 30B is inserted into the second slot 22B. The terminal 35C is a terminal connected to the bus clock terminal 64B of the second slot 22B when the SSD module 30 is inserted into the second slot 22B. In the embodiment, as the terminal 35 of the SSD module 30, the terminal 35A is an example of "first terminal", the terminal 35B is an example of "fourth terminal", and the terminal 35C is an example of "second terminal".

The memory controller 32 includes a port 152A, a port 152B, a port 152C, and a port 152D. The port 152A is connected to the terminal 35A via a signal line 151A of the board 31. The port 152B is connected to the terminal 35B via a signal line 151B of the board 31. The port 152C is connected to the terminal 35C via a signal line 151C of the board 31. The port 152D is connected to the terminal 35D via a signal line 151D of the board 31. In the embodiment, the port 152A is an example of "first port", the port 152B is an example of "fourth port", the port 152C is an example of "second port", and the port 152D is an example of "third port".

In the embodiment, the memory controller 32 includes, for example, a determination part 161 and a port control part 162. The determination part 161 is configured to carry out a determination regarding the posture of the SSD module 30 connected to the connector 20. For example, the determination part 161 carries out a determination as to whether the SSD module 30 is connected to the connector 20 in the upward posture or in the downward posture. From another viewpoint, the determination part 161 carries out a determination to distinguish whether the SSD module 30 is connected to the first slot 22A or the second slot 22B of the connector 20. In the embodiment, as the determination regarding the aforementioned posture of the SSD module 30, the determination part 161 determines whether or not the signal input from the terminal 35D connected to the PEDET terminal 72A (hereinbelow, it may be referred to as "PEDET signal") is the first voltage signal.

The port control part 162 controls or manages a correspondence relationship between the ports 152A, 152B, and 152C of the memory controller 32 and the aforementioned functions assigned to the ports 152A, 152B, and 152C, respectively. For example, the port control part 162 changes the functions (signals) assigned to the ports 152A, 152B, and 152C as necessary such that signals transmitted to the ports 152A, 152B, and 152C correspond to the functions (signals) assigned to the ports 152A, 152B, and 152C.

Each of the determination part 161 and the port control part 162 is a software functional part realized by executing a program (for example, firmware) by a hardware processor such as a CPU included in the memory controller 32. However, all or some of the determination part 161 and the port control part 162 may be realized by hardware such as an application specific integrated circuit (ASIC), a programmable logic device (PLD), a field programmable gate array (FPGA), or the like (including circuit section; circuitry) or may be realized by cooperation of software and hardware.

Figure 13:
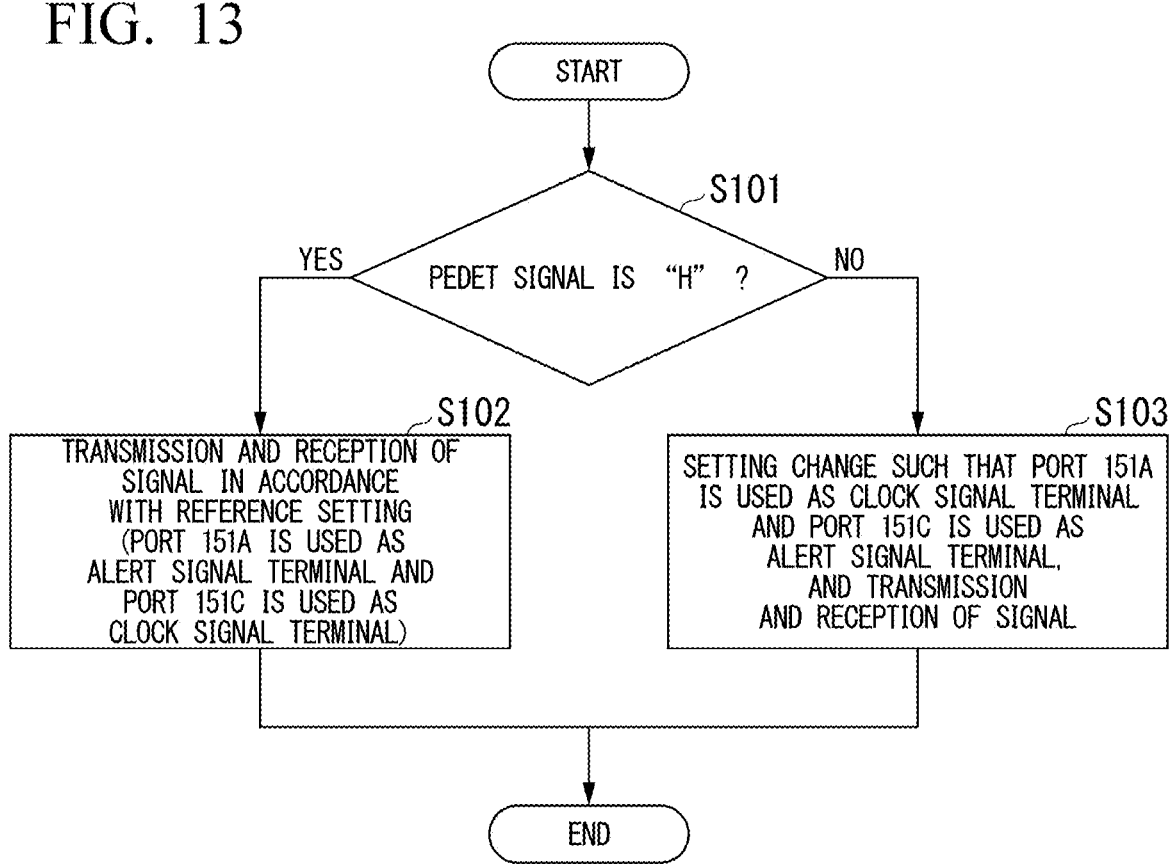
FIG. 13 is a flowchart showing processing of an SSD module according to the first embodiment.

FIG. 13 is a flowchart showing processing of the SSD module 30 regarding a change of signal. When the SSD module 30 is connected to the connector 20, the determination part 161 determines whether or not the PEDET signal input from the terminal 53D connected to the PEDET terminal 72A is the first voltage signal (S101).

When the determination part 161 determines that the PEDET signal is the first voltage signal (S101: YES), the port control part 162 does not change the correspondence relationship between the ports 152A, 152B, and 152C of the memory controller 32 and the functions (signals) assigned to the aforementioned ports 152A, 152B, and 152C from the reference setting. The memory controller 32 carries out transmission and reception of the various signals in accordance with the reference setting (S102). In this case, the port control part 162 uses the port 152A as an alert signal port and outputs the alert signal from the port 152A. Additionally, the port control part 162 uses the port 152B as a bus data signal port and carries out transmission and reception of the specific command or the data signal via the port 152B. Furthermore, the port control part 162 uses the port 152C as a clock signal port and inputs the clock signal to the port 152C.

On the other hand, when the determination part 161 determines that the PEDET signal is not the first voltage signal (S101: NO), the port control part 162 changes the correspondence relationship between the ports 152A, 152B, and 152C of the memory controller 32 and the functions (signals) assigned to the aforementioned ports 152A, 152B, and 152C from the reference setting. The memory controller 32 carries out transmission and reception of the various signals in accordance with the changed setting (S103). In this case, the port control part 162 uses the port 152A as the clock signal and inputs the clock signal to the port 152A. Additionally, the port control part 162 uses the port 152B as a bus data signal port and carries out transmission and reception of the specific command or the data signal via the port 152B. Furthermore, the port control part 162 uses the port 152C as the alert signal port and outputs the alert signal from the port 152C.

<6.3 Processing of Host Device Regarding Determination of Standard of SSD Module>

In the embodiment, the host controller 11 cannot receive the signal input from the PEDET terminal 72B of the second slot 22B. Consequently, the host controller 11 carries out a determination regarding the standard of the first SSD module 30A and the second SSD module 30B in accordance with the signal (PEDET signal) input from the PEDET terminal 72A of the first slot 22A.

Figure 14:
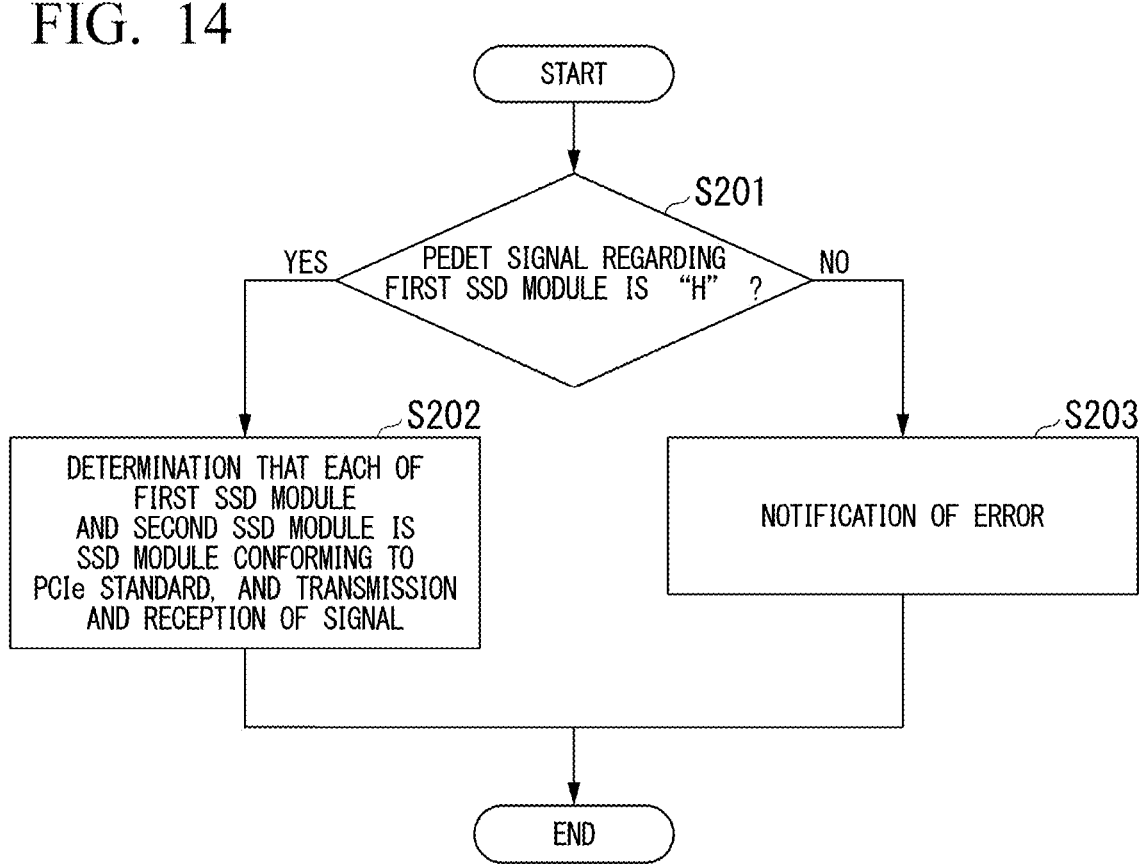
FIG. 14 is a flowchart showing processing of a host device according to the first embodiment.

FIG. 14 is a flowchart showing processing of the host device 10 regarding a determination of the standard of the SSD module 30. The host device 10 according to the embodiment carries out the following determination on the premise that the SSD module 30 conforming to the same standard as the first SSD module 30A and the second SSD module 30B is used.

The host controller 11 determines whether or not the PEDET signal input from the PEDET terminal 72A of the first slot 22A is the first voltage signal (S201). When the host controller 11 determines that the PEDET signal input from the PEDET terminal 72A of the first slot 22A is the first voltage signal (S201: YES), the host controller 11 determines that each of the first SSD module 30A and the second SSD module 30B is the SSD module 30 conforming to the first standard (for example, a PCIe standard). In this case, the host controller 11 determines that each of the first SSD module 30A and the second SSD module 30B is a suitable SSD module 30, and the host controller 11 carries out transmission and reception of the various signals (S202).

On the other hand, when the host controller 11 determines that the PEDET signal input from the PEDET terminal 72A of the first slot 22A is not the first voltage signal (S201: NO), the host controller 11 determines that each of the first SSD module 30A and the second SSD module 30B is not the SSD module conforming to the first standard. In this case, the host controller 11 determines that each of the first SSD module 30A and the second SSD module 30B is not a suitable SSD module 30, and the host controller 11 causes a display device or the like to notify an error (S203).

7. Advantage

In the embodiment, the first terminal group TG1 of the first slot 22A and the second terminal group TG2 of the second slot 22B to which the same signal is transmitted are arranged next to each other in the Z direction in the connector 20. With this configuration, regarding a part of terminals included in the first terminal group TG1 and a part of terminals included in the first terminal group TG2, the coupling structure between the connector 20 and the circuit board 16 can be simplified, or some wirings provided on the circuit board 16 can be used as a common wiring. As a result, the storage system 1 can be made small in size.

Moreover, in the embodiment, the memory controller 32 of the SSD module 30 includes the port 152A, the port 152C, and the port 152D. When the signal input to the port 152D satisfies the first condition, the memory controller 32 uses the port 152A as a first signal port for a first signal and uses the port 152C as a second signal port for a second signal. When the signal input to the port 152D satisfies the second condition, the memory controller 32 uses the port 152A as the second signal port for the second signal and uses the port 152C as the first signal port for the first signal. With this configuration, when the first terminal group TG1 of the first slot 22A and the second terminal group TG2 of the second slot 22B are arranged next to each other in the Z direction in the connector 20, it is possible to shorten the interconnection length of the conductive portion 91 that connects a part of terminals included in the first terminal group TG1 and a part of terminals included in the first terminal group TG2. As a result, the storage system 1 can be further made small in size.

8. Modified Example

Next, a modified example according to the first embodiment will be described. Note that, configurations of the modified example other than those described below are the same as the configurations according to the first embodiment.

Figure 15:
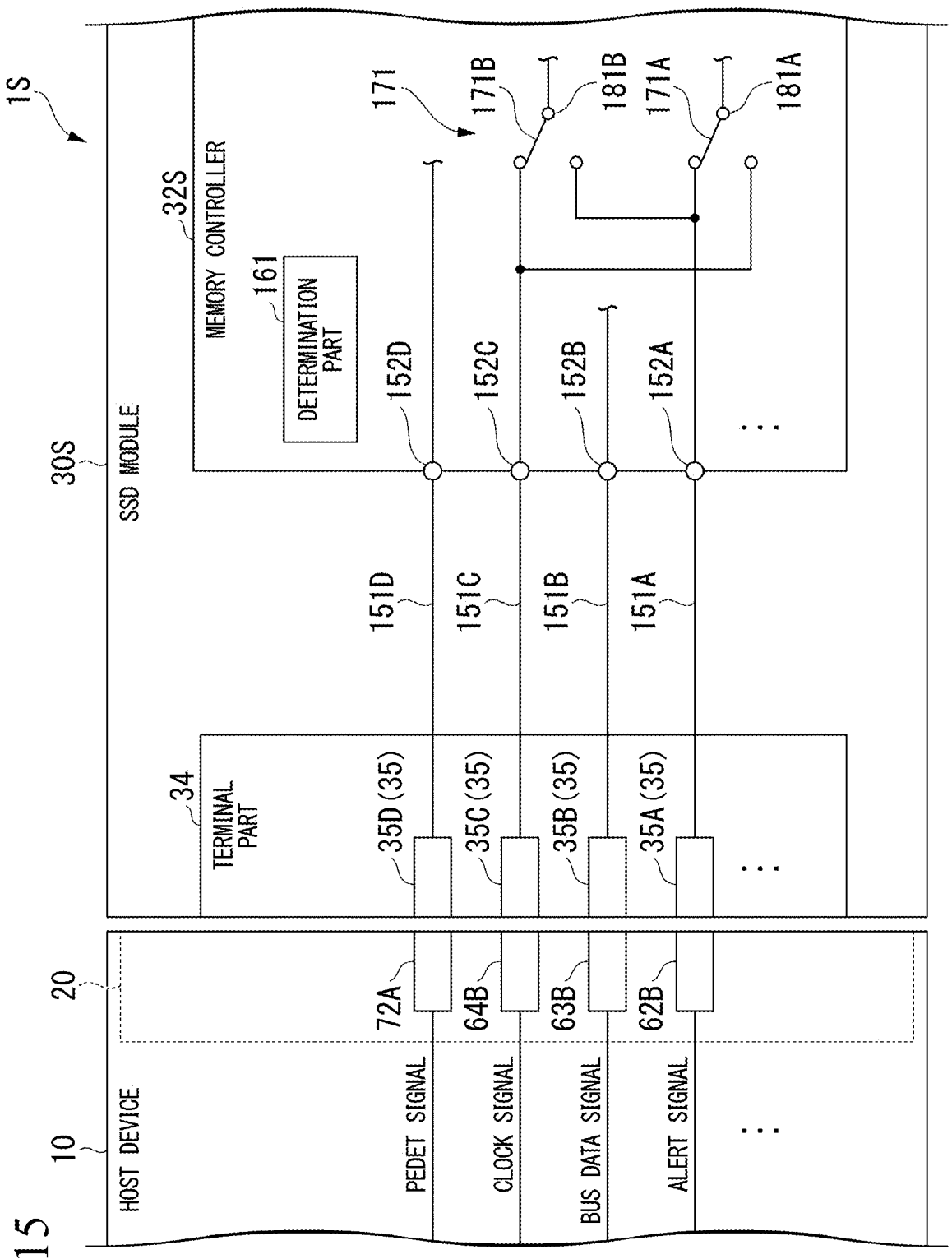
FIG. 15 is a block diagram showing part of a functional configuration of a storage system according to a modified example.
Figure 16:
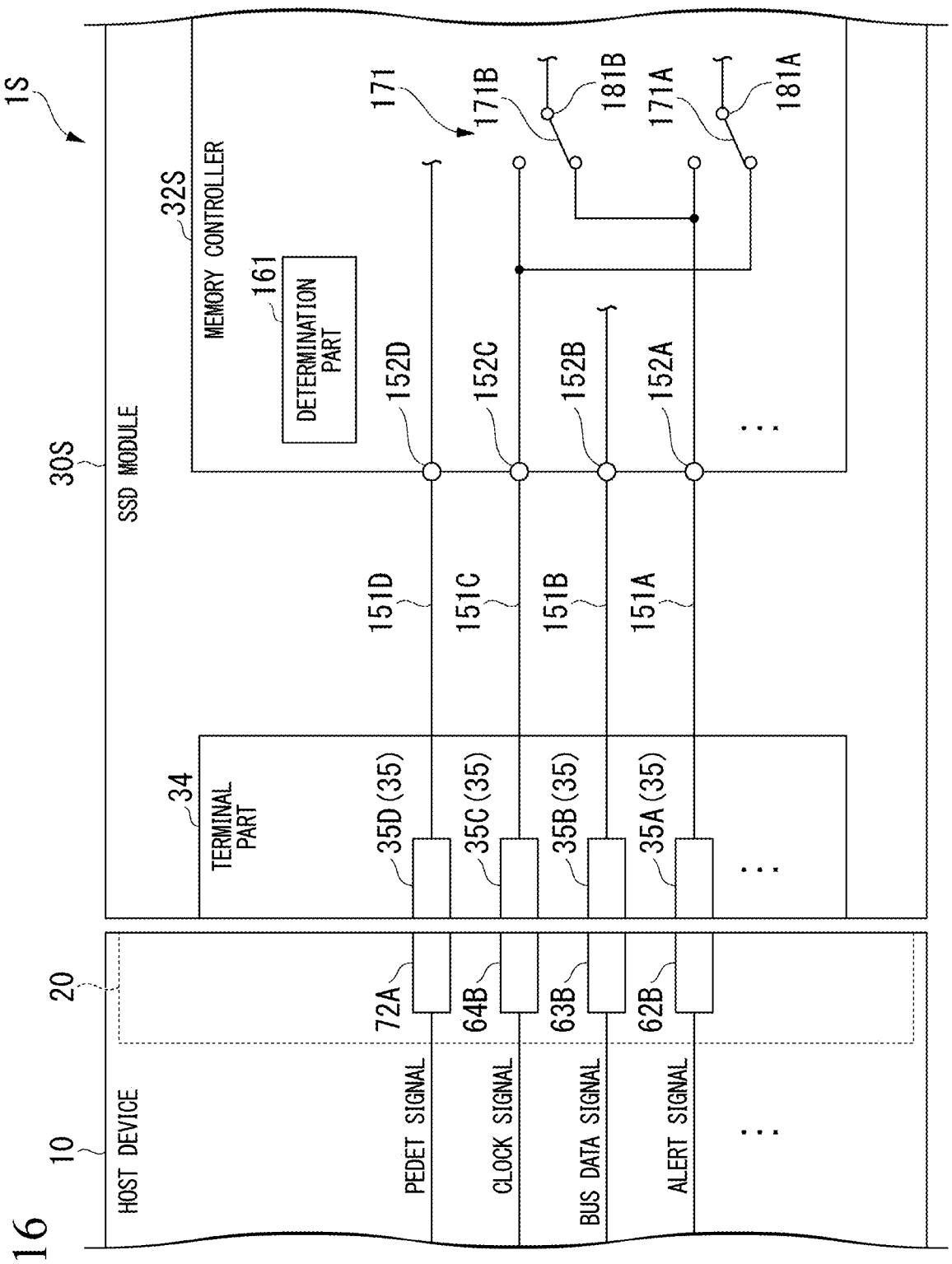
FIG. 16 is a block diagram showing another part of a functional configuration of the storage system according to the modified example.

FIGS. 15 and 16 are block diagrams showing part of a functional configuration of a storage system 1S according to the modified example of the first embodiment. In the modified example, a memory controller 32S of a SSD module 30S includes the determination part 161, a switching part 171, an inner node 181A, and an inner node 181B.

The switching part 171 includes, for example, a first switching device 171A and a second switching device 171B. Each of the first switching device 171A and the second switching device 171B is hardware provided inside the memory controller 32S. Each of the first switching device 171A and the second switching device 171B is, for example, a multiplexer or a transistor. Each of the first switching device 171A and the second switching device 171B is configured to change a connection relationship of each switching device in accordance with a control signal output from the determination part 161. The inner node 181A is a node for an alert signal. The inner node 181B is a node for a clock signal.

FIG. 15 shows the case in which the SSD module 30 is inserted into the first slot 22A. In this case, the first switching device 171A connects the port 152A and the inner node 181A in accordance with the control signal from the determination part 161. Furthermore, the second switching device 171B connects the port 152C and the inner node 181B in accordance with the control signal from the determination part 161. Consequently, the port 152A is used as the alert signal port, and the port 152C is used as the clock signal port.

FIG. 16 shows the case in which the SSD module 30 is inserted into the second slot 22B. In this case, the first switching device 171A connects the port 152A and the inner node 181B in accordance with the control signal from the determination part 161. Furthermore, the second switching device 171B connects the port 152C and the inner node 181A in accordance with the control signal from the determination part 161. Consequently, the port 152A is used as the clock signal port, and the port 152C is used as the alert signal port.

Second Embodiment

Next, a second embodiment will be described. The second embodiment is different from the first embodiment in that the first PLP signal terminal 65B and the second PLP signal terminal 66B of the second terminal group TG2 are changed instead of the alert signal terminal 62B and the bus clock terminal 64B of the second terminal group TG2. Note that, configurations other than those described below are the same as those of the first embodiment.

Figure 17:
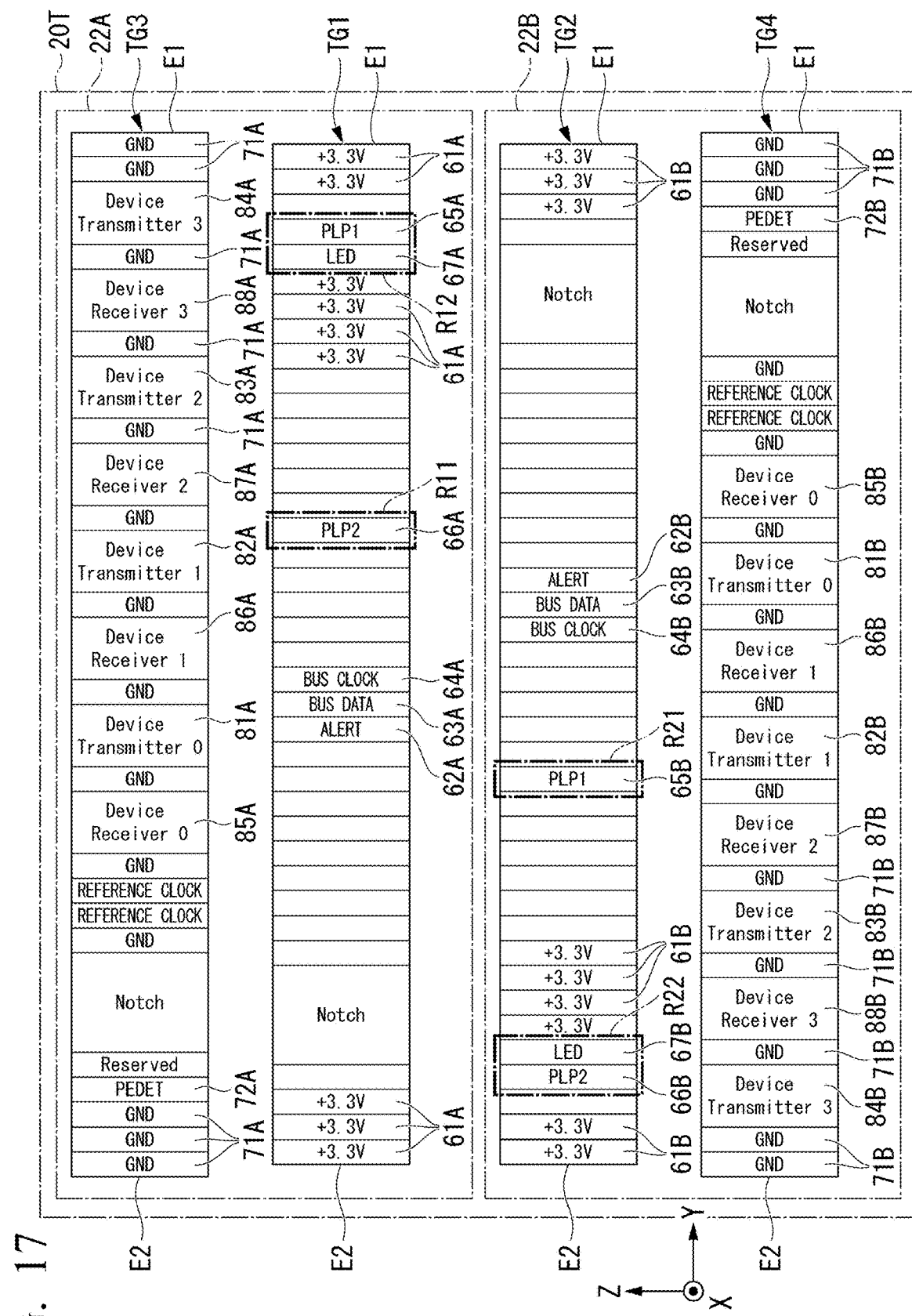
FIG. 17 is a diagram showing terminal arrangements of four terminal groups according to a second embodiment.

FIG. 17 is a diagram showing terminal arrangements of four terminal groups TG1, TG2, TG3, and TG4 of a connector 20T according to the second embodiment. In the embodiment, the arrangement order in the Y direction of the first PLP signal terminal 65A, the state signal terminal 67A, and the second PLP signal terminal 66A (refer to dashed-dotted lines R11 and R12 of FIG. 17) included in the first terminal group TG1 is the same setting as that of the arrangement order in the Y direction of the first PLP signal terminal 65B, the state signal terminal 67B, and the second PLP signal terminal 66B (refer to dashed-dotted lines R21 and R22 of FIG. 17) included in the second terminal group TG2.

In the embodiment, regarding the terminals of the connector 20, the first PLP signal terminal 65B is an example of "first terminal", the second PLP signal terminal 66B is an example of "second terminal", the state signal terminal 67B is an example of "fourth terminal", and the PEDET terminal 72A is an example of "third terminal". Each of the first PLP signal transmitted through the first PLP signal terminal 65A and the first PLP signal transmitted through the first PLP signal terminal 65B is an example of "first signal". Each of the second PLP signal transmitted through the second PLP signal terminal 66A and the second PLP signal transmitted through the second PLP signal terminal 66B is an example of "second signal". Each of a state notification signal transmitted through the state signal terminal 67A and a state notification signal transmitted through the state signal terminal 67B is an example of "third signal".

FIG. 18 is an explanatory view of terminal arrangements of second terminal groups TG2. PART (a) of FIG. 18 shows the Comparative Example. PART (b) of FIG. 18 shows the embodiment. As shown in PART (a) of FIG. 18, for example, the Comparative Example shows that the terminal arrangement of the first terminal group TG1 and the terminal arrangement of the second terminal group TG2 are in a complete rotational symmetrical relationship. In this configuration, the conductive portion 91 that connects the first PLP signal terminal 65A and the first PLP signal terminal 65B, the conductive portion 91 that connects the state signal terminal 67A and the state signal terminal 67B, and the conductive portion 91 that connects the second PLP signal terminal 66A and the second PLP signal terminal 66B are in a relationship of crossing each other. Consequently, for example, some of the conductive portions 91 are necessary to be wired so as to circumvent the second terminal group TG2, and therefore it is difficult to form all of the above-mentioned three conductive portions 91 with a short length.

In contrast to the above-mentioned Comparative Example, as shown in PART (b) of FIG. 18, although the terminal arrangement of the second terminal group TG2 is rotationally symmetrical to the terminal arrangement of the first terminal group TG1, the placement of the first PLP signal terminal 65B and the second PLP signal terminal 66B in the terminal arrangement of the second terminal group TG2 is changed so as to be different from those of PART (a) of FIG. 18. Specifically, in the direction from the left side to the right side in PART (a) of FIG. 18, the first PLP signal terminal 65B, the state signal terminal 67B, and the second PLP signal terminal 66B are arranged in this order in the second terminal group TG2. In contrast, in the direction from the left side to the right side in PART (b) of FIG. 18, the second PLP signal terminal 66B, the state signal terminal 67B, and the first PLP signal terminal 65B are arranged in this order in the second terminal group TG2. More specifically, the terminal arrangement of the second PLP signal terminal 66A, the state signal terminal 67A, and the first PLP signal terminal 65A of the first terminal group TG1 corresponds to the terminal arrangement of the second PLP signal terminal 66B, the state signal terminal 67B, and the first PLP signal terminal 65B of the second terminal group TG2 in the direction from the left side to the right side in PART (b) of FIG. 18. With this configuration, the conductive portion 91 that connects the first PLP signal terminal 65A and the first PLP signal terminal 65B, the conductive portion 91 that connects the state signal terminal 67A and the state signal terminal 67B, and the conductive portion 91 that connects the second PLP signal terminal 66A and the second PLP signal terminal 66B are not in a relationship of crossing each other. Accordingly, the lengths of the aforementioned three conductive portions 91 can be shorter than those of the configuration of the Comparative Example shown in PART (a) of FIG. 18.

Other explanations according to the embodiment are the same as the above explanations according to the first embodiment. Particularly, similarly to the first embodiment, the memory controller 32 is connectable to the connector 20T in which the first PLP signal terminal 65B and the second PLP signal terminal 66B are changed to each other by changing the functions (signals) assigned to the ports of the memory controller 32. Also with this configuration, it is possible to obtain the same effect as that of the first embodiment.

Third Embodiment

Next, a third embodiment will be described. The third embodiment is different from the first embodiment in that the host device 10 is applicable to two kinds of standard (for example, a PCIe standard and a SATA standard). Note that, configurations other than those described below are the same as those of the first embodiment.

Figure 19:
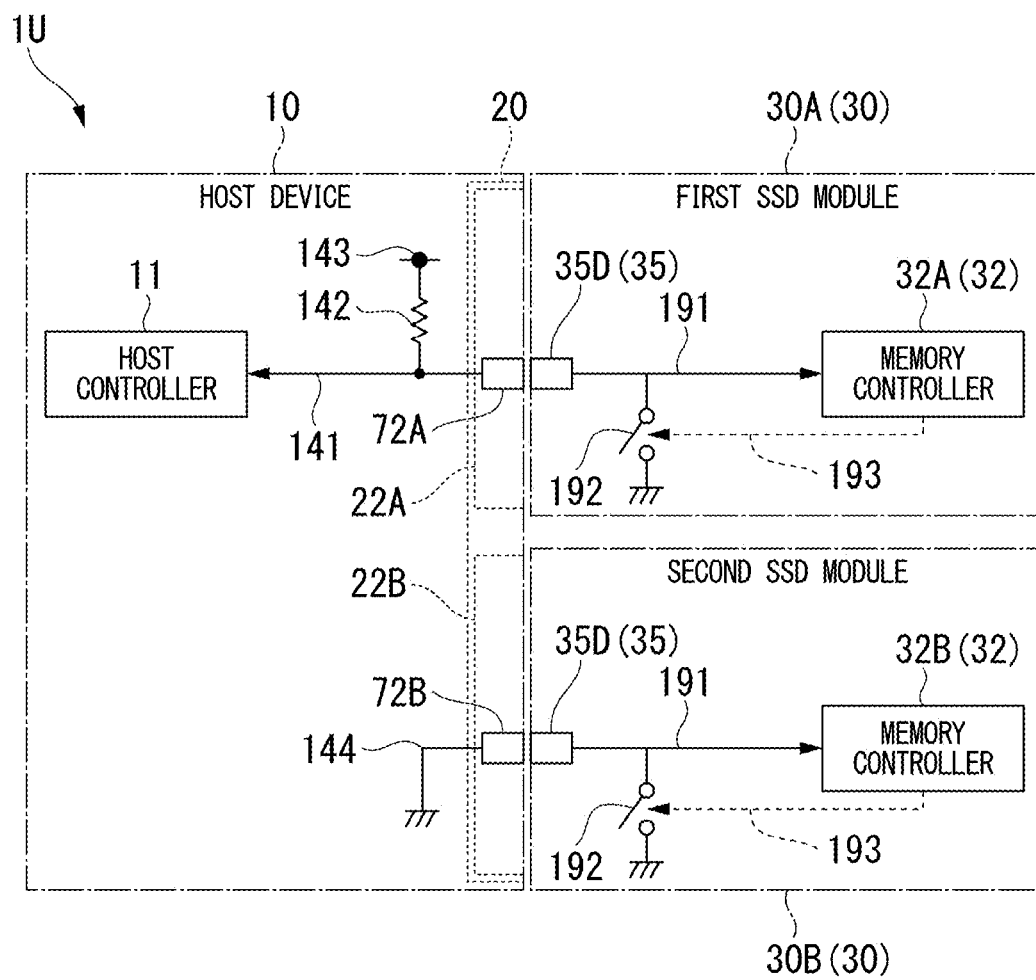
FIG. 19 is an explanatory view of a method of using a PEDET terminal according to a third embodiment.

FIG. 19 is an explanatory view of a method of using the PEDET terminal 72A of a storage device 1U according to the third embodiment. In the embodiment, the SSD module 30 conforming to the second standard (for example, a SATA standard) includes a signal line 191, a switching device 192, and a control line 193. The signal line 191 connects the terminal 35D connected to the PEDET terminal 72A and the memory controller 32. The switching device 192 can cause the signal line 191 to be connected to a ground. The switching device 192 is connected to the memory controller 32 via the control line 193. The switching device 192 is configured to carry out opening and closing operations in accordance with the control signal input from the memory controller 32 via the control line 193. The switching device 192 needs to be configured by, for example, a transistor.

In the embodiment, the memory controller 32 of the SSD module 30 conforming to the second standard causes the switching device 192 to be in the ON state in a particular period previously set, and thereby connects the signal line 191 to the ground. Next, in the aforementioned particular period, the host controller 11 determines whether the signal input from the PEDET terminal 72A is the first voltage signal (for example, a high-level voltage) or the second voltage signal (for example, a low-level voltage). Note that, for example, the "particular period" may be set to a particular period immediately after power is supplied to the SSD module 30 or may be set to a particular period at the timing different from the power supply to the SSD module.

Figure 20:
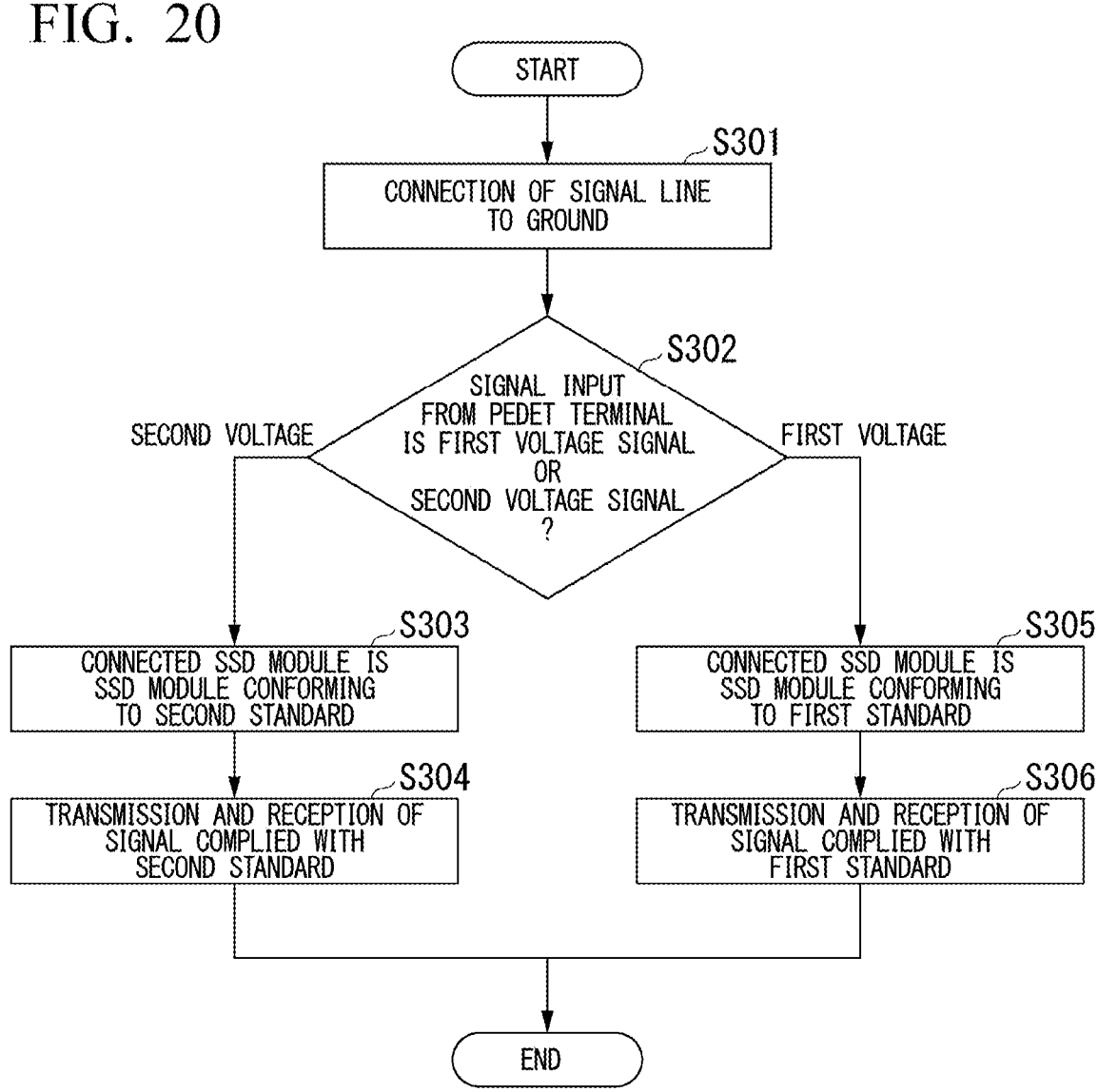
FIG. 20 is a flowchart showing processing of a storage system including an SSD module according to the third embodiment.

FIG. 20 is a flowchart showing processing of the storage system 1 provided with the SSD module 30 according to the third embodiment. Here, for example, the case in which the SSD module 30 conforming to the second standard is connected to the connector 20 will be described.

The memory controller 32 of the SSD module 30 conforming to the second standard causes the switching device 192 to be in the ON state in a particular period previously set, and thereby connects the signal line 191 to the ground (S301). For this reason, the second voltage signal is input to the host controller 11 from the PEDET terminal 72A.

In the aforementioned particular period, the host controller 11 determines whether the signal input from the PEDET terminal 72A is the first voltage signal or the second voltage signal (S302). When the second voltage signal is input from the PEDET terminal 72A in the aforementioned particular period (S302: second voltage), the host controller 11 determines that the SSD module 30 connected to the connector 20 (for example, the first SSD module 30A connected to the first slot 22A) is the SSD module 30 conforming to the second standard (for example, a SATA standard) (S303). In this case, the host controller 11 carries out transmission and reception of a signal complying with the second standard with respect to the SSD module 30 (S304). Note that, also in the embodiment, on the premise that the SSD module 30 conforming to the same standard as the first SSD module 30A and the second SSD module 30B is used, when the host controller 11 determines that the first SSD module 30A connected to the first slot 22A is the SSD module 30 conforming to the second standard, the host controller 11 determines that the second SSD module 30B connected to the second slot 22B is also the SSD module 30 conforming to the second standard.

On the other hand, also in the embodiment, when the SSD module 30 (i.e., the SSD module 30 described with reference to PART (a) of FIG. 10 or FIG. 11) conforming to the first standard (for example, a PCIe standard) is connected to the connector 20, the first voltage signal (for example, a high-level voltage) is input to the host controller 11 from the PEDET terminal 72A in the aforementioned particular period. When the first voltage signal is input from the PEDET terminal 72A in the aforementioned particular period (S302: first voltage), the host controller 11 determines that the SSD module 30 connected to the connector 20 is the SSD module 30 conforming to the first standard (for example, a PCIe standard) (S305). In this case, the host controller 11 carries out transmission and reception of a signal complying with the first standard with respect to the SSD module 30 (S306). As described above, on the premise that the SSD module 30 conforming to the same standard as the first SSD module 30A and the second SSD module 30B is used, when the host controller 11 determines that the first SSD module 30A connected to the first slot 22A is the SSD module 30 conforming to the first standard, the host controller 11 determines that the second SSD module 30B connected to the second slot 22B is also the SSD module 30 conforming to the first standard.

With this configuration, it is possible to provide a storage system 1U applicable to a plurality of standards (for example, a PCIe standard and a SATA standard).

Fourth Embodiment

Next, a fourth embodiment will be described. The fourth embodiment is different from the first embodiment in that a mounting posture of the SSD module 30 is detected in accordance with a command received from the host device 10 instead of the signal output from the PEDET terminal 72A. Note that, configurations other than those described below are the same as those of the first embodiment.

Figure 21:
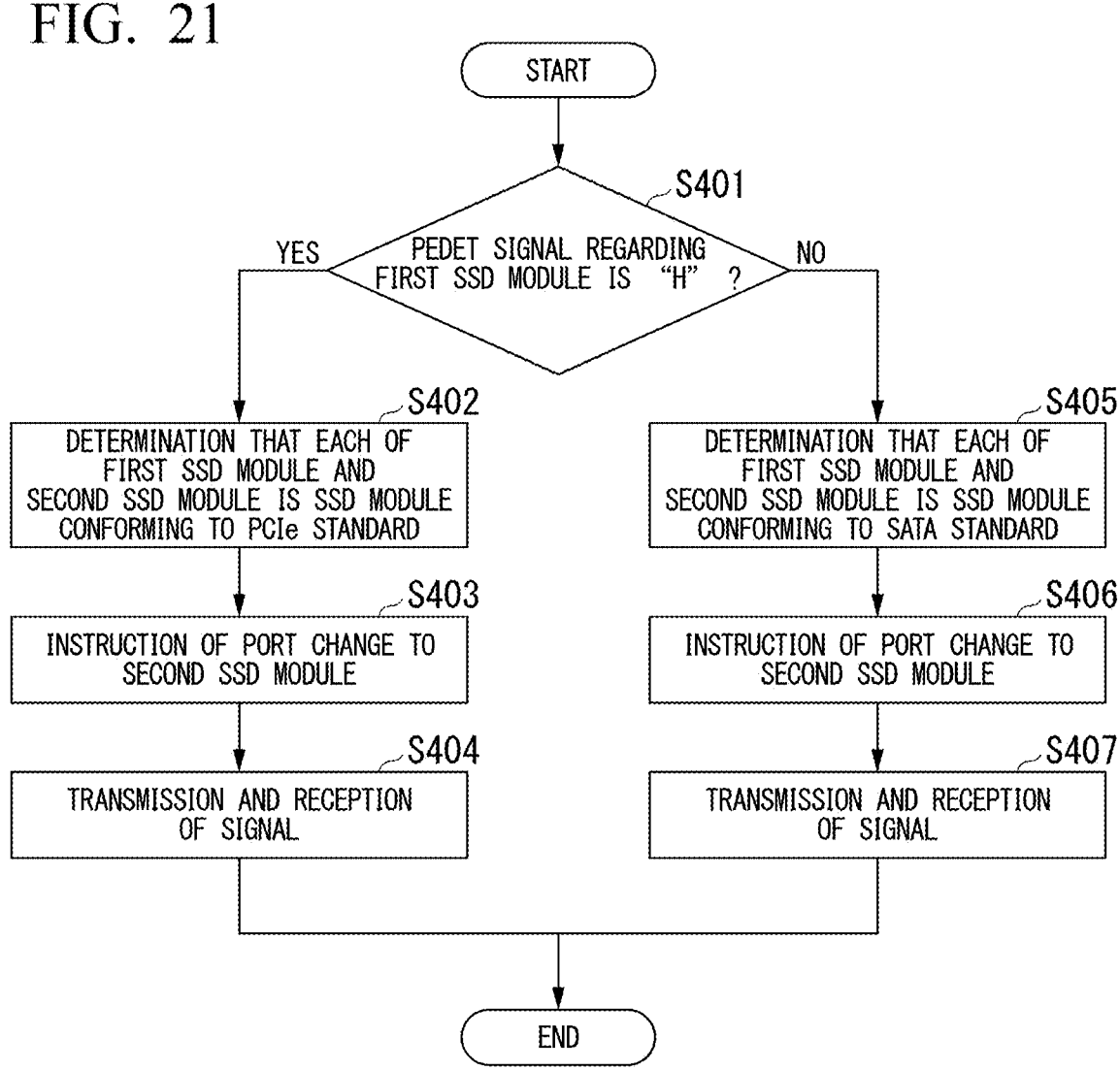
FIG. 21 is a flowchart showing processing of a storage system including an SSD module according to a fourth embodiment.

FIG. 21 is a flowchart showing processing of the storage system 1 provided with the SSD module 30 according to the fourth embodiment. In the embodiment, the PEDET terminal 72A is used in the same state as the PEDET terminal 72 of the Comparative Example shown in FIG. 10. That is, the PEDET signal is not input to the memory controller 32. The host device 10 according to the embodiment carries out the following determination on the premise that the SSD module 30 conforming to the same standard as the first SSD module 30A and the second SSD module 30B is used.

In accordance with the PEDET signal input from the PEDET terminal 72A of the first slot 22A to the host controller 11, the host controller 11 determines whether the SSD module 30 connected to the first slot 22A is the SSD module 30 conforming to the first standard (for example, a PCIe standard) or the SSD module 30 conforming to the second standard (for example, a SATA standard) (S301). That is, the host controller 11 determines whether or not the PEDET signal regarding the SSD module 30 (the first SSD module 30A) connected to the first slot 22A is the first voltage (for example, a high-level voltage).

When the host controller 11 determines that the PEDET signal input from the PEDET terminal 72A of the first slot 22A is the first voltage signal (for example, a high-level voltage) (S401: YES), the host controller 11 determines that each of the first SSD module 30A and the second SSD module 30B is the SSD module 30 conforming to the first standard (for example, a PCIe standard) (S402). In this case, the host controller 11 transmits a command for changing a correspondence relationship between the signals and the ports 152A and 152C of the memory controller 32 to the SSD module 30 connected to the second slot 22B (S403). For example, the command is not a signal utilizing the bus data terminal 63A included in the SM Bus but the command is transmitted to the SSD module 30 by use of the PCIe standard or the SATA standard utilizing one or more of the first to fourth transmission terminals 81A to 84A.

The memory controller 32 of the SSD module 30 connected to the second slot 22B changes the correspondence relationship between the signals and the ports 152A and 152C in accordance with the command received from the host controller 11. Specifically, the signals for the ports 152A and 152C are exchanged (or swapped) to each other. Thereafter, the host controller 11 determines that each of the first SSD module 30A and the second SSD module 30B is the SSD module 30 conforming to the first standard, and the host controller 11 carries out transmission and reception of the various signals (S404).

On the other hand, when the host controller 11 determines that the PEDET signal input from the PEDET terminal 72A of the first slot 22A is the second voltage signal (for example, a low-level voltage) (S401: NO), the host controller 11 determines that each of the first SSD module 30A and the second SSD module 30B is the SSD module 30 conforming to the second standard (for example, a SATA standard) (S405). In this case, the host controller 11 transmits a command for changing a correspondence relationship between the signals and the ports 152A and 152C of the memory controller 32 to the SSD module 30 connected to the second slot 22B (S406).

The memory controller 32 of the SSD module 30 connected to the second slot 22B changes the correspondence relationship between the signals and the ports 152A and 152C in accordance with the command received from the host controller 11. Specifically, the signals for the ports 152A and 152C are exchanged (or swapped) to each other. Thereafter, the host controller 11 determines that each of the first SSD module 30A and the second SSD module 30B is the SSD module 30 conforming to the second standard, and the host controller 11 carries out transmission and reception of the various signals (S407).

Also with this configuration, similarly to the above-described first embodiment, the storage system 1 can be made small in size.

While some embodiments and modified examples have been described above, the embodiments and the modified examples are not limited to the above examples. For example, two or more of the embodiments and the modified examples described above may be realized by a combination thereof. For example, as a result of combination of the first embodiment and the third embodiment, the alert signal terminal 62B and the bus clock terminal 64B may be changed to each other and the first PLP signal terminal 65B and the second PLP signal terminal 66B may be changed to each other.

According to at least one embodiment described above, the memory controller of the memory system includes a first port, a second port, and a third port. When a signal input to the third port or a command received from the outside of the memory system satisfies a first condition, the memory controller uses the first port as a first signal port for a first signal and uses the second port as a second signal port for a second signal. When the signal input to the third port or the command received from the outside of the memory system satisfies a second condition, the memory controller uses the first port as the second signal port and uses the second port as the first signal port. According to such a configuration, the storage system can be made small in size.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a board including a terminal part, the terminal part being connectable to an outside connector;
a memory controller on the board; and
a semiconductor memory on the board, the semiconductor memory being connected to the memory controller, wherein
the terminal part includes a first terminal, a second terminal, and a third terminal,
the memory controller includes a first port, a second port, and a third port, the first port being connected to the first terminal, the second port being connected to the second terminal, the third port being connected to the third terminal,
when a signal input to the third port or a command received from the outside of the memory system satisfies a first condition, the memory controller is configured to use the first port as a first signal port for a first signal and to use the second port as a second signal port for a second signal different from the first signal, and
when the signal input to the third port or the command received from the outside of the memory system satisfies a second condition different from the first condition, the memory controller is configured to use the first port as the second signal port and to use the second port as the first signal port.

2. The memory system according to claim 1, wherein
the terminal part further includes a fourth terminal between the first terminal and the second terminal,
the memory controller further includes a fourth port connected to the fourth terminal, and
when the first condition or the second condition is satisfied, the memory controller uses the fourth port as a third signal port for a third signal different from each of the first signal and the second signal.

3. The memory system according to claim 1, wherein
the first signal is a clock signal or a signal notifying a particular state.

4. The memory system according to claim 1, wherein
the first signal is a signal which changes when power supply to the memory system is cut off or when a data-saving processing of the memory system is completed without failure.

5. The memory system according to claim 1, wherein
each of the first terminal, the second terminal, and the third terminal complies with a PCIe standard.

6. The memory system according to claim 2, wherein
the first signal is a clock signal or a signal notifying a particular state.

7. The memory system according to claim 2, wherein
the first signal is a signal which changes when power supply to the memory system is cut off or when a data-saving processing of the memory system is completed without failure.

8. The memory system according to claim 2, wherein
each of the first terminal, the second terminal, and the third terminal complies with a PCIe standard.

9. A method of controlling a memory system, comprising:
the memory system includes a first port, a second port, and a third port,
the method comprising:
when a signal input to the third port or a command received from an outside of the memory system satisfies a first condition, using the first port as a first signal port for a first signal and using the second port as a second signal port for a second signal different from the first signal, and
when the signal input to the third port or the command received from the outside of the memory system satisfies a second condition different from the first condition, using the first port as the second signal port and using the second port as the first signal port.

10. The method according to claim 9, wherein
the memory system further includes a fourth port, the method further comprising:
when the first condition or the second condition are satisfied, using the fourth port as a third signal port for a third signal different from each of the first signal and the second signal.

11. The method according to claim 9, wherein
the first signal includes one of:
 a) a clock signal;
 b) a signal notifying a particular state; and
 c) a signal which changes when power supply to the memory system is cut off or when a data-saving processing of the memory system is completed without failure.

* * * * *